US009357211B2

(12) United States Patent
Li et al.

(10) Patent No.: US 9,357,211 B2
(45) Date of Patent: May 31, 2016

(54) DEVICE AND METHOD FOR SCALABLE AND MULTIVIEW/3D CODING OF VIDEO INFORMATION

(71) Applicant: QUALCOMM Incorporated, San Diego, CA (US)

(72) Inventors: Xiang Li, San Diego, CA (US); Jianle Chen, San Diego, CA (US); Marta Karczewicz, San Diego, CA (US); Vadim Seregin, San Diego, CA (US); Wei Pu, San Diego, CA (US); Krishnakanth Rapaka, San Diego, CA (US); Liwei Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 14/137,101

(22) Filed: Dec. 20, 2013

(65) Prior Publication Data

US 2014/0185680 A1 Jul. 3, 2014

Related U.S. Application Data

(60) Provisional application No. 61/758,723, filed on Jan. 30, 2013, provisional application No. 61/790,200, (Continued)

(51) Int. Cl.
*H04N 11/02* (2006.01)
*H04N 19/187* (2014.01)
(Continued)

(52) U.S. Cl.
CPC ....... *H04N 19/00321* (2013.01); *H04N 19/154* (2014.11); *H04N 19/187* (2014.11); *H04N 19/52* (2014.11); *H04N 19/59* (2014.11); *H04N 19/593* (2014.11); *H04N 19/597* (2014.11)

(58) Field of Classification Search
USPC ........................................ 375/240.01–240.29
See application file for complete search history.

(56) References Cited

U.S. PATENT DOCUMENTS 5,515,377 A * 5/1996 Horne .................. H04N 21/236
370/395.64
5,742,343 A * 4/1998 Haskell .................. H04N 19/61
348/487

(Continued)

OTHER PUBLICATIONS

Bross, B., et al., "High Efficiency Video Coding (HEVC) text specification draft 7," 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-I1003, May 10, 2012, XP030112373, 269 pp.

(Continued)

*Primary Examiner* — Leron Beck
(74) *Attorney, Agent, or Firm* — Knobbe, Martens, Olson & Bear, LLP

(57) ABSTRACT

An apparatus configured to code (e.g., encode or decode) video information includes a memory unit and a processor in communication with the memory unit. The memory unit is configured to store video information associated with a base layer and an enhancement layer. The processor is configured to up-sample a base layer reference block by using an up-sampling filter when the base and enhancement layers have different resolutions; perform motion compensation interpolation by filtering the up-sampled base layer reference block; determine base layer residual information based on the filtered up-sampled base layer reference block; determine weighted base layer residual information by applying a weighting factor to the base layer residual information; and determine an enhancement layer block based on the weighted base layer residual information. The processor may encode or decode the video information.

28 Claims, 15 Drawing Sheets

Related U.S. Application Data filed on Mar. 15, 2013, provisional application No. 61/747,028, filed on Dec. 28, 2012, provisional application No. 61/747,113, filed on Dec. 28, 2012, provisional application No. 61/748,245, filed on Jan. 2, 2013, provisional application No. 61/751,794, filed on Jan. 11, 2013.

(51) Int. Cl.
   *H04N 19/597*  (2014.01)
   *H04N 19/52*   (2014.01)
   *H04N 19/593*  (2014.01)
   *H04N 19/154*  (2014.01)
   *H04N 19/59*   (2014.01)

(56) References Cited

U.S. PATENT DOCUMENTS

| | | | | |
|---|---|---|---|---|
| 2005/0252361 | A1* | 11/2005 | Oshikiri | G10L 19/16 84/605 |
| 2006/0012719 | A1* | 1/2006 | Karczewicz | H04N 19/187 348/699 |
| 2006/0088101 | A1* | 4/2006 | Han | H04N 19/51 375/240.16 |
| 2008/0165848 | A1* | 7/2008 | Ye | H04N 19/105 375/240.13 |
| 2008/0165855 | A1* | 7/2008 | Wang | H04N 19/105 375/240.16 |
| 2008/0211901 | A1* | 9/2008 | Civanlar | H04N 7/152 348/14.09 |
| 2008/0225952 | A1* | 9/2008 | Wang | H04N 19/105 375/240.16 |
| 2008/0297380 | A1* | 12/2008 | Yamanashi | G10L 19/005 341/50 |
| 2009/0060050 | A1* | 3/2009 | Park | H04N 19/105 375/240.24 |
| 2009/0110073 | A1* | 4/2009 | Wu | H04N 7/50 375/240.15 |
| 2009/0129468 | A1* | 5/2009 | Park | H04N 19/105 375/240.13 |
| 2009/0129474 | A1* | 5/2009 | Pandit | H04N 19/00721 375/240.16 |
| 2009/0220004 | A1* | 9/2009 | Cieplinski | H04N 19/593 375/240.16 |
| 2010/0046622 | A1* | 2/2010 | Doser | H04N 19/105 375/240.13 |
| 2010/0135393 | A1* | 6/2010 | Ying Gao | H04N 19/00315 375/240.15 |
| 2010/0246674 | A1* | 9/2010 | Park | H04N 19/105 375/240.13 |
| 2012/0093218 | A1* | 4/2012 | Chang | H04N 21/234327 375/240.02 |

OTHER PUBLICATIONS

Bross, B., et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v13, 317 pp.

Francois, E., et al., "Non-TE3: Simplification of Generalized Residual Inter-Layer Prediction (GRILP) in SHVC," Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, Document: JCTVC-L0104, pp. 1-5.

Han, W.J., et al., "Improved Video Compression Efficiency Through Flexible Unit Representation and Corresponding Extension of Coding Tools," IEEE Transaction on Circuits and Systems for Video Technology, vol. 20 , No. 12, Dec. 2010, pp. 1709-1720.

Sullivan, G.J., et al., "Overview of the High Efficiency Video Coding (HEVC) Standard", IEEE Transactions on Circuit and Systems for Video Technology, IEEE Service Center, Piscataway, NJ, US, vol. 22 (12), Dec. 1, 2012, pp. 1649-1668, XP011486324, ISSN: 1051-8215, DOI: 10.1109/TCSVT.2012.2221191.

Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/no.jvtcv-K0036; Oct. 2, 2012, XP030112968, pp. 1-22.

Gisquet C et al., "Combination of several interlayer tools", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-L0108, Jan. 7. 2013, pp. 1-5, XP030113596.

International Search Report and Written Opinion—PCT/US2013/077435—ISA/EPO—Jun. 8, 2013.

Li X. et al., "TE3: Results of Test 4.6.2.1 on Generalized Residual Prediction", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-L0078, Jan. 8, 2013, XP030113566.

Partial International Search Report—PCT/US2013/077435—ISA/EPO—Apr. 2, 2015.

Tsukuba T., et al., "On interpolation filter for Generalized Residual Prediction", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-L0265, Jan. 8, 2013, pp. 1-5, XP030113753.

* cited by examiner

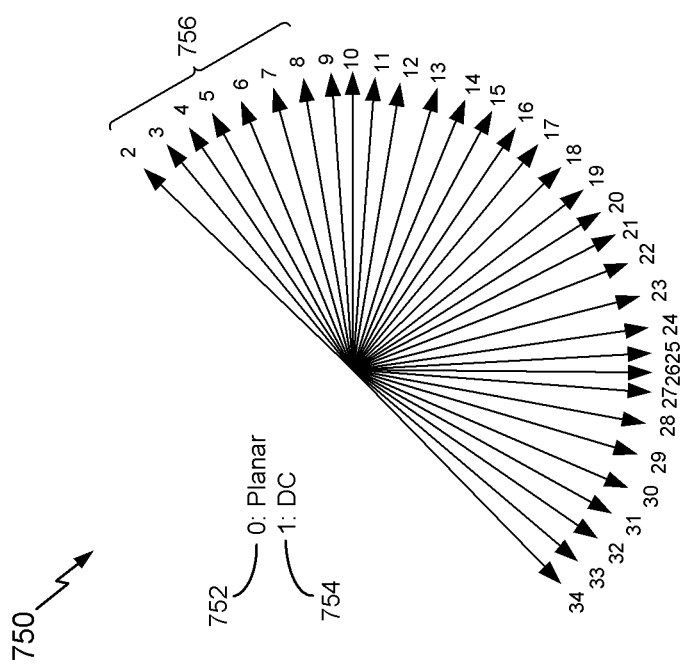
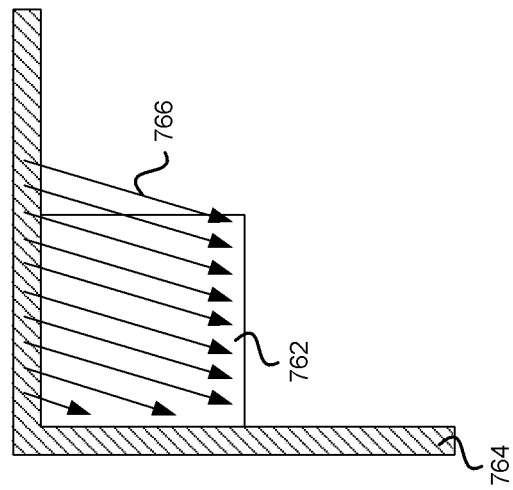
FIG. 7A
FIG. 7B

DEVICE AND METHOD FOR SCALABLE AND MULTIVIEW/3D CODING OF VIDEO INFORMATION

CROSS-REFERENCE TO RELATED APPLICATIONS

This application claims priority to U.S. Provisional No. 61/747,028, filed Dec. 28, 2012, U.S. Provisional No. 61/747,113, filed Dec. 28, 2012, U.S. Provisional No. 61/748,245, filed Jan. 2, 2013, U.S. Provisional No. 61/751,794, filed Jan. 11, 2013, U.S. Provisional No. 61/758,723, filed Jan. 30, 2013, and U.S. Provisional No. 61/790,200, filed Mar. 15, 2013, all of which are hereby incorporated by reference in their entireties.

TECHNICAL FIELD

This disclosure relates to the field of video coding and compression, particularly to scalable video coding (SVC) or multiview video coding (MVC, 3DV).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. For SVC, the base layer can carry video data with a base level of quality. The one or more enhancement layers can carry additional video data to support higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a layer in the middle may be an EL for the layers below it, such as the base layer or any intervening enhancement layers, and at the same time serve as a RL for one or more enhancement layers above it. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, a current block in the enhancement layer or another view may be predicted using the residual information of the base layer. For example, if the co-located block in the base layer is inter-predicted, its residue may be up-sampled according to the spatial resolution ratio of the base layer and enhancement layer to predict the current block in the enhancement layer. Such inter-layer residual prediction often involves an up-sampling filter for up-sampling the base layer reference layer and reconstructed base layer, and a motion compensation (MC) interpolation filter for interpolating the reference samples when the motion vector points to a sub-pixel position.

However, in some situations, if the enhancement layer block is too small or if the up-sampling filter and/or the MC interpolation filter is too complex, the memory access requirements associated with the up-sampling and MC interpolation may significantly increase coding complexity. Thus, in such situations, the coding complexity may be reduced by restricting the residual prediction and/or simplifying the filters used therein. By doing so, the techniques described in this disclosure may reduce computational complexity associated with a method of coding video information.

The systems, methods and devices of this disclosure each have several innovative aspects, no single one of which is solely responsible for the desirable attributes disclosed herein.

In one embodiment, an apparatus configured to code (e.g., encode or decode) video information includes a memory unit and a processor in communication with the memory unit. The memory unit is configured to store video information associated with a base layer and an enhancement layer. The processor is configured to up-sample a base layer reference block by using an up-sampling filter when the base layer and the enhancement layer have different resolutions, perform motion compensation interpolation by filtering the up-sampled base layer reference block, determine base layer residual information based on the filtered up-sampled base layer reference block, determine weighted base layer residual information by applying a weighting factor to the base layer residual information, and determine an enhancement layer block based on the weighted base layer residual information. The up-sampling filter used by the processor may have 6 or fewer taps (e.g., 5-tap, 4-tap, 3-tap, etc.).

In one embodiment, the processor is configured to up-sample the base layer reference block using a 4-tap up-sampling filter, and perform the motion compensation interpolation by using a bilinear interpolation filter. In one embodiment, the processor is configured to up-sample the base layer reference block and perform the motion compensation interpolation by applying a single 5-tap combined up-sampling and motion compensation interpolation filter. The combined up-sampling and motion compensation interpolation filter may have 16 phases for both luma and chroma components of the enhancement layer block, and the enhancement layer motion vector is scaled to the accuracy of $\frac{1}{16}$ of a pixel. In one embodiment, the processor is configured to use a 3-tap smoothing filter, a 3-tap up-sampling filter, and/or a 3-tap inter-layer filter (e.g., to perform smoothing, up-sampling, or other inter-layer filtering). In one embodiment, the processor is configured to determine, in response to determining that a luma-only mode is enabled, only the luma component of the enhancement layer block based on the weighted base layer residual information, and determine the chroma components of the enhancement layer block by using normal temporal prediction. In another embodiment, the processor is configured to determine, in response to determining that a chroma-only mode is enabled, only the chroma components of the enhancement layer block based on the weighted base layer residual information, and determine the luma component of the enhancement layer block by using normal temporal prediction.

In one embodiment, a method of coding (e.g., encoding or decoding) video information comprises storing video information associated with a base layer and an enhancement layer, determining a base layer reference block using an enhancement layer motion vector, up-sampling the base layer reference block by using an up-sampling filter having 6 or fewer taps when the base and enhancement layers have different resolutions, performing motion compensation interpolation by filtering the up-sampled base layer reference block, determining base layer residual information based on the filtered up-sampled base layer reference block, determining weighted base layer residual information by applying a weighting factor to the base layer residual information, and determining an enhancement layer block based on the weighted base layer residual information.

In one embodiment, an apparatus configured to code (e.g., encode or decode) video information includes a memory unit and a processor in communication with the memory unit. The memory unit is configured to store video information associated with a base layer and an enhancement layer. The processor is configured to determine whether an enhancement layer block has a size that is greater than or equal to a threshold size. In response to determining that the enhancement layer block has a size that is greater than or equal to the threshold size, the processor is further configured to: up-sample a base layer reference block by using an up-sampling filter, when the base and enhancement layers have different resolutions; perform motion compensation interpolation by filtering the up-sampled base layer reference block; determine base layer residual information based on the filtered up-sampled base layer reference block; determine weighted base layer residual information by applying a weighting factor to the base layer residual information; and determine an enhancement layer block based on the weighted base layer residual information.

In one embodiment, the processor, in response to determining that the enhancement layer block has a size that is not greater than or equal to the threshold size, performs Generalized Residual Prediction (GRP) for the enhancement layer block only if the enhancement layer block is a uni-predicted block. As further discussed in greater detail below, GRP uses weighting factors to employ various coding techniques (e.g., inter prediction, inter-layer residual prediction, inter-layer intra prediction, etc.) to predict the enhancement layer block. In another embodiment, the GRP performed by the processor is intra GRP (e.g., intra prediction, intra prediction performed in the difference domain, etc.), and a neighboring reference sample that is adjacent to the enhancement layer block and is unavailable for use in the intra prediction is substituted based on a bit depth of the enhancement layer and whether the intra prediction is performed in a difference domain. Intra GRP is further discussed in greater detail below. In yet another embodiment, the weighting factor is derived from a block that is spatially neighboring or adjacent to the enhancement layer block, a block in a picture temporally adjacent to a current picture in which the enhancement layer block is located, or a base layer block that is co-located with the enhancement layer block. Alternatively, the weighting factor may be set to a default value and no weighting information may be signaled for the enhancement layer block.

In one embodiment, the processor is configured to add an inter-layer reference picture including GRP weighting information and an upsampled texture picture of the base layer to a reference picture list. In another embodiment, the processor is configured to determine a mimicked base layer reference picture that can be accessed instead of accessing a base layer reference picture, by filtering an enhancement layer reference picture that is co-located with the base layer reference picture, and to determine the enhancement layer block based on the mimicked base layer reference picture. In yet another embodiment, the processor is configured to filter the co-located enhancement layer reference picture using a fixed 4-tap low-pass filter, a fixed 3-tap low-pass filter, and/or an adaptive filter.

In one embodiment, a method of coding (e.g., encoding or decoding) video information comprises storing video information associated with a base layer and an enhancement layer, determining whether an enhancement layer block has a size that is greater than or equal to a threshold size, and performing GRP, in response to determining that the enhancement layer block has a size that is greater than or equal to the threshold size. The GRP may be performed at least by: up-sampling a base layer reference block by using an up-sampling filter when the base and enhancement layers have different resolutions; performing motion compensation interpolation by filtering the up-sampled base layer reference block; determining base layer residual information based on the filtered up-sampled base layer reference block; determining weighted base layer residual information by applying a weighting factor to the base layer residual information; and determining the enhancement layer block based on the weighted base layer residual information.

BRIEF DESCRIPTION OF DRAWINGS

FIGS. 7A and 7B are conceptual diagrams showing various modes and directional orientations of intra prediction.

DETAILED DESCRIPTION

Figure 1:
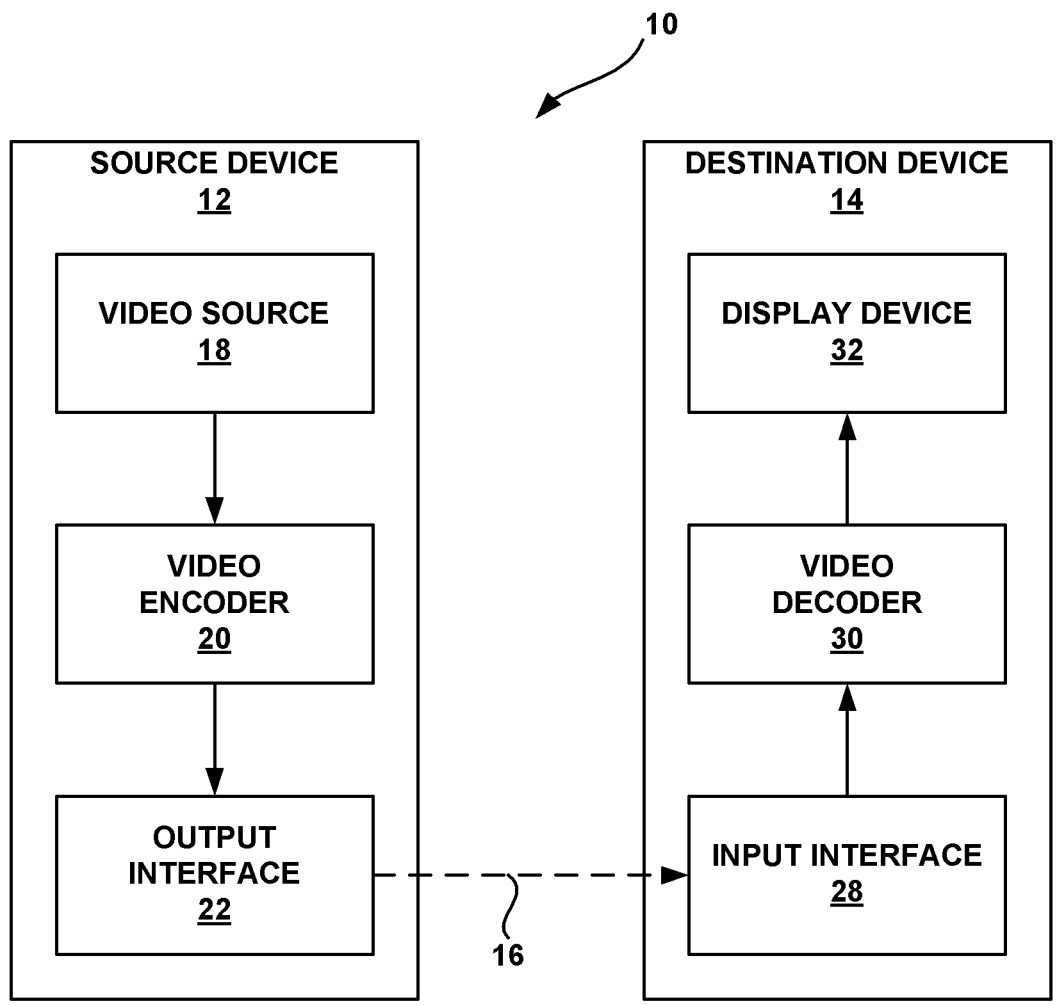
FIG. 1 is a block diagram illustrating an example of a video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

For purposes of illustration only, certain embodiments disclosed herein are described with examples including only two layers (e.g., lower level layer such as the base layer, and a higher level layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions, all of which are incorporated by reference in their entireties.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.it-sudparis.eu/jct/doc_end_user/documents/12_Geneva/wg11/JCTVC-L1003-v34.zip, as of Nov. 22, 2013, which is incorporated by reference in its entirety. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., groups of pictures (GOPs). Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPS), sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video coder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2:
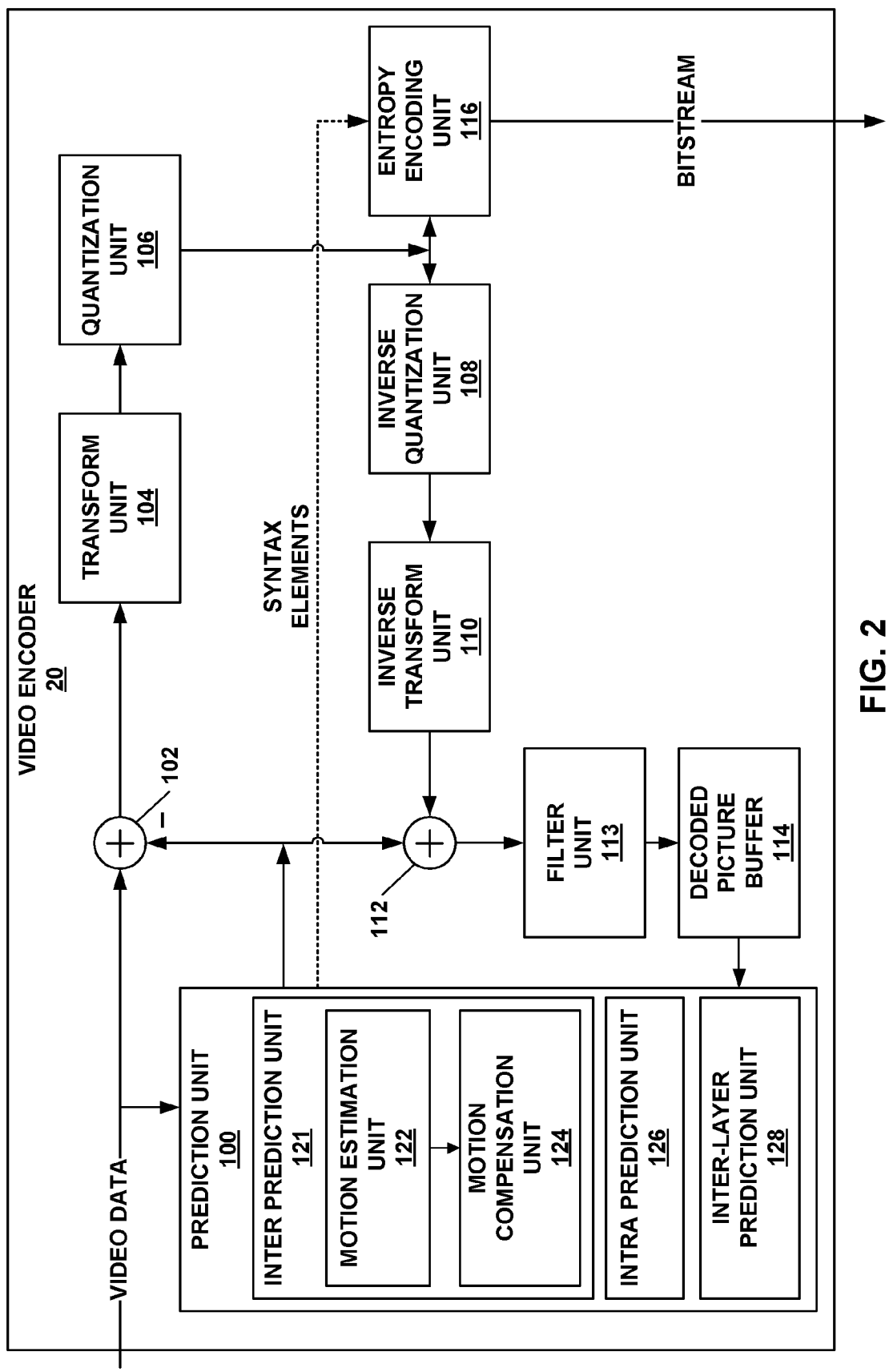
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, prediction unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2, video encoder 20 includes a plurality of functional components. The functional components of video encoder 20 include a prediction unit 100, a residual generation unit 102, a transform unit 104, a quantization unit 106, an inverse quantization unit 108, an inverse transform unit 110, a reconstruction unit 112, a filter unit 113, a decoded picture buffer 114, and an entropy encoding unit 116. Prediction unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction unit 100 may perform quadtree partitioning on the video block of the treeblock to divide the video block into progressively smaller video blocks. Each of the smaller video blocks may be associated with a different CU. For example, prediction unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction unit 100 may generate a hierarchical quadtree data structure for the treeblock. For example, a treeblock may correspond to a root node of the quadtree data structure. If prediction unit 100 partitions the video block of the treeblock into four sub-blocks, the root node has four child nodes in the quadtree data structure. Each of the child nodes corresponds to a CU associated with one of the sub-blocks. If prediction unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As further discussed below with reference to FIGS. 8-14, the prediction unit 100 may be configured to code (e.g., encode or decode) the PU (or any other enhancement layer blocks or video units) by performing the methods illustrated in FIGS. 8-14. For example, inter prediction unit 121 (e.g., via motion estimation unit 122 and/or motion compensation unit 124), intra prediction unit 126, or inter-layer prediction unit 128 may be configured to perform the methods illustrated in FIGS. 8-14, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction unit 100 may select the prediction data for a PU from among the prediction data generated by motion compensation unit 124 for the PU or the prediction data generated by intra prediction unit 126 for the PU. In some examples, prediction unit 100 selects the prediction data for the PU based on rate/distortion metrics of the sets of prediction data.

If prediction unit 100 selects prediction data generated by intra prediction unit 126, prediction unit 100 may signal the intra prediction mode that was used to generate the prediction data for the PUs, e.g., the selected intra prediction mode. Prediction unit 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction unit 100 selects the prediction data for PUs of a CU, residual generation unit 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform unit 104 may generate one or more transform coefficient blocks for each TU of a CU by applying one or more transforms to a residual video block associated with the TU. Each of the transform coefficient blocks may be a 2D matrix of transform coefficients. Transform unit 104 may apply various transforms to the residual video block associated with a TU. For example, transform unit 104 may apply a discrete cosine transform (DCT), a directional transform, or a conceptually similar transform to the residual video block associated with a TU.

After transform unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
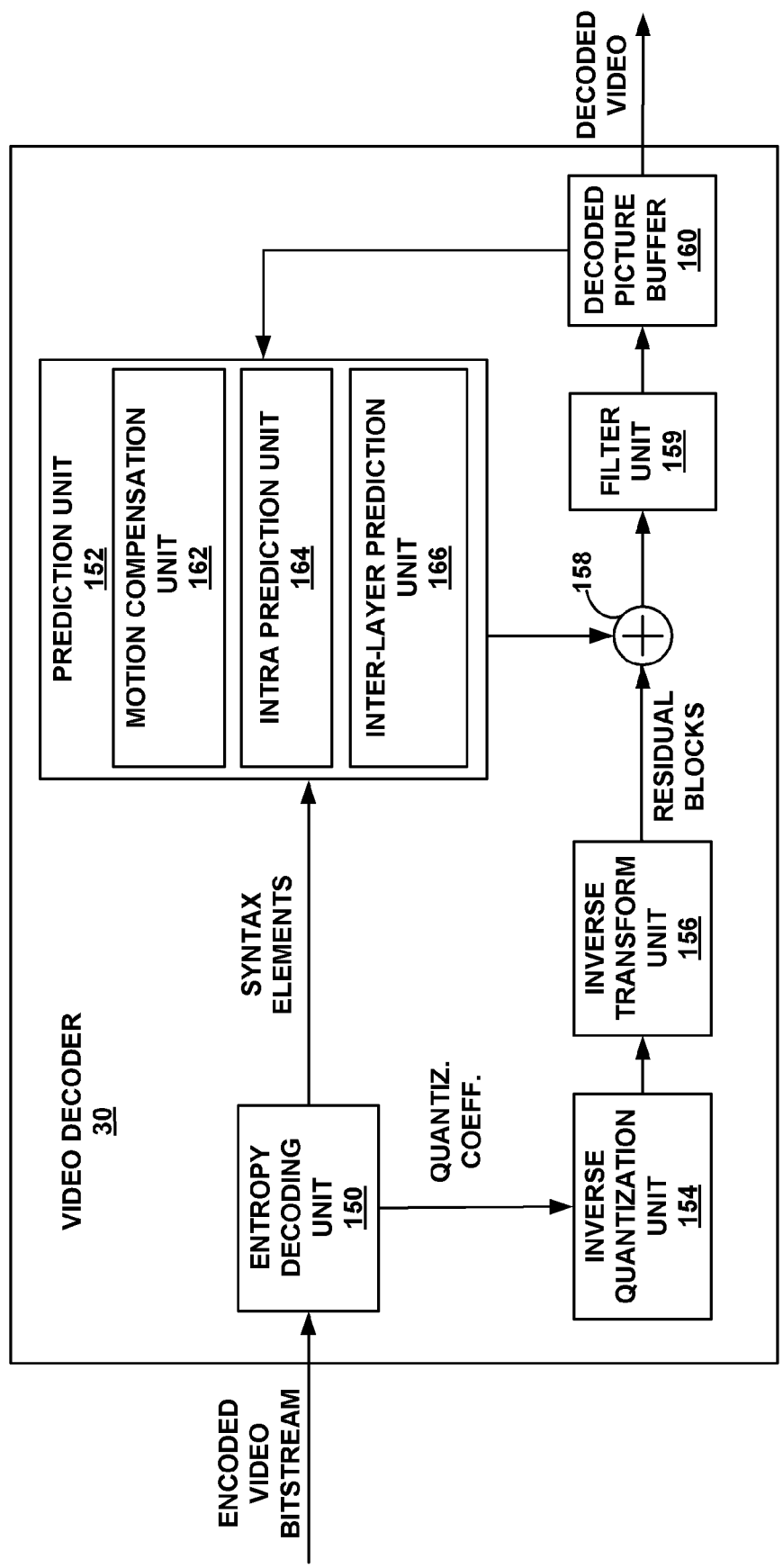
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes a plurality of functional components. The functional components of video decoder 30 include an entropy decoding unit 150, a prediction unit 152, an inverse quantization unit 154, an inverse transform unit 156, a reconstruction unit 158, a filter unit 159, and a decoded picture buffer 160. Prediction unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with subsample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

As further discussed below with reference to FIGS. 8-14, the prediction unit 152 may code (e.g., encode or decode) the PU (or any other enhancement layer blocks or video units) by performing the methods illustrated in FIGS. 8-14. For example, motion compensation unit 162, intra prediction unit 164, or inter-layer prediction unit 166 may be configured to perform the methods illustrated in FIGS. 8-14, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Structures of Scalable Video Coding (SVC)

Figure 4:
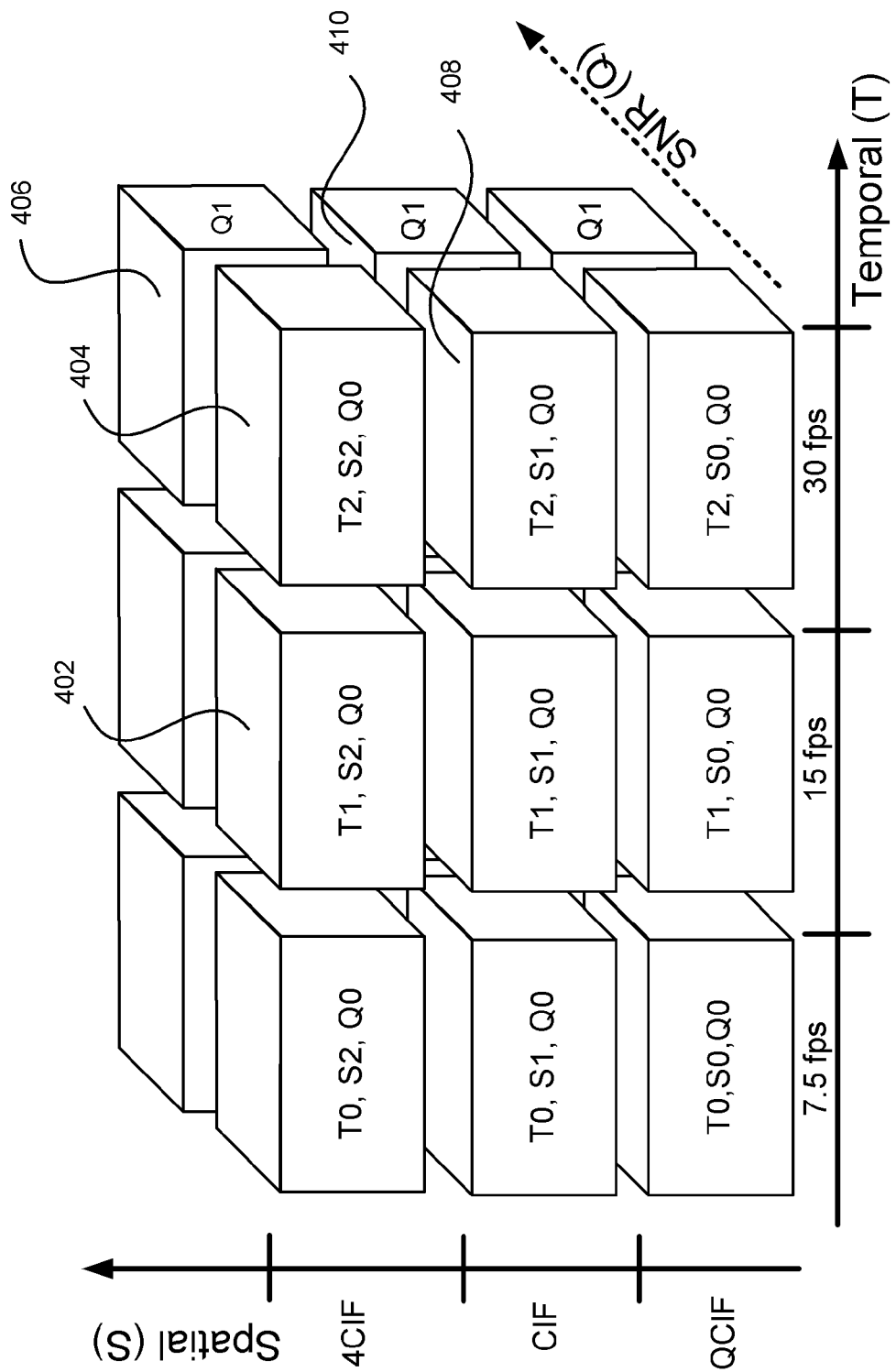
FIG. 4 is a conceptual diagram illustrating SVC scalabilities in different dimensions.

FIG. 4 is a conceptual diagram showing example scalabilities in different dimensions. As discussed above, the scalable video coding extension (SVC) of HEVC allows video information to be provided in layers. Each layer can provide video information corresponding to a different scalability. In HEVC, scalabilities are enabled in three dimensions: temporal (or time) scalability, spatial scalability, and quality scalability (sometimes referred to as signal-to-noise ratio or SNR scalability). For example, in the time dimension, frame rates with 7.5 Hz, 15 Hz, 30 Hz, and etc. can be supported by temporal scalability (T). When spatial scalability (S) is supported, different resolutions such as QCIF, CIF, 4CIF, and etc. may be enabled. For each specific spatial resolution and frame rate, the SNR (Q) layers can be added to improve the picture quality.

Once video content has been encoded in such a scalable way, an extractor tool may be used to adapt the actual delivered content according to application requirements, which can depend, for example, on the clients or the transmission channel. In the example shown in FIG. 4, each cubic contains the pictures with the same frame rate (temporal level), spatial resolution and SNR layers. For example, cubes 402 and 404 contain pictures having the same resolution and SNR, but different frame rates. Cubes 402 and 406 represent pictures having the same resolution (e.g., in the same spatial layer), but different SNRs and frame rates. Cubes 402 and 408 represent pictures having the same SNR (e.g., in the same quality layer), but different resolutions and frame rates. Cubes 402 and 410 represent pictures having different resolutions, frame rates, and SNRs. Better representation can be achieved by adding those cubes (pictures) in any dimension. Combined scalability is supported when there are two, three or even more scalabilities enabled. For example, by combining the pictures in cube 402 with those in cube 404, a higher frame rate may be realized. By combining the pictures in cube 404 with those in cube 406, a better SNR may be realized.

According to the SVC specification, the pictures with the lowest spatial and quality layer are compatible with H.264/AVC, and the pictures at the lowest temporal level form the temporal base layer, which can be enhanced with pictures at higher temporal levels. In addition to the H.264/AVC compatible layer, several spatial and/or SNR enhancement layers can be added to provide spatial and/or quality scalabilities. SNR scalability is also referred as quality scalability. Each spatial or SNR enhancement layer itself may be temporally scalable, with the same temporal scalability structure as the H.264/AVC compatible layer. For one spatial or SNR enhancement layer, the lower layer it depends on is also referred as the base layer of that specific spatial or SNR enhancement layer.

Figure 5:
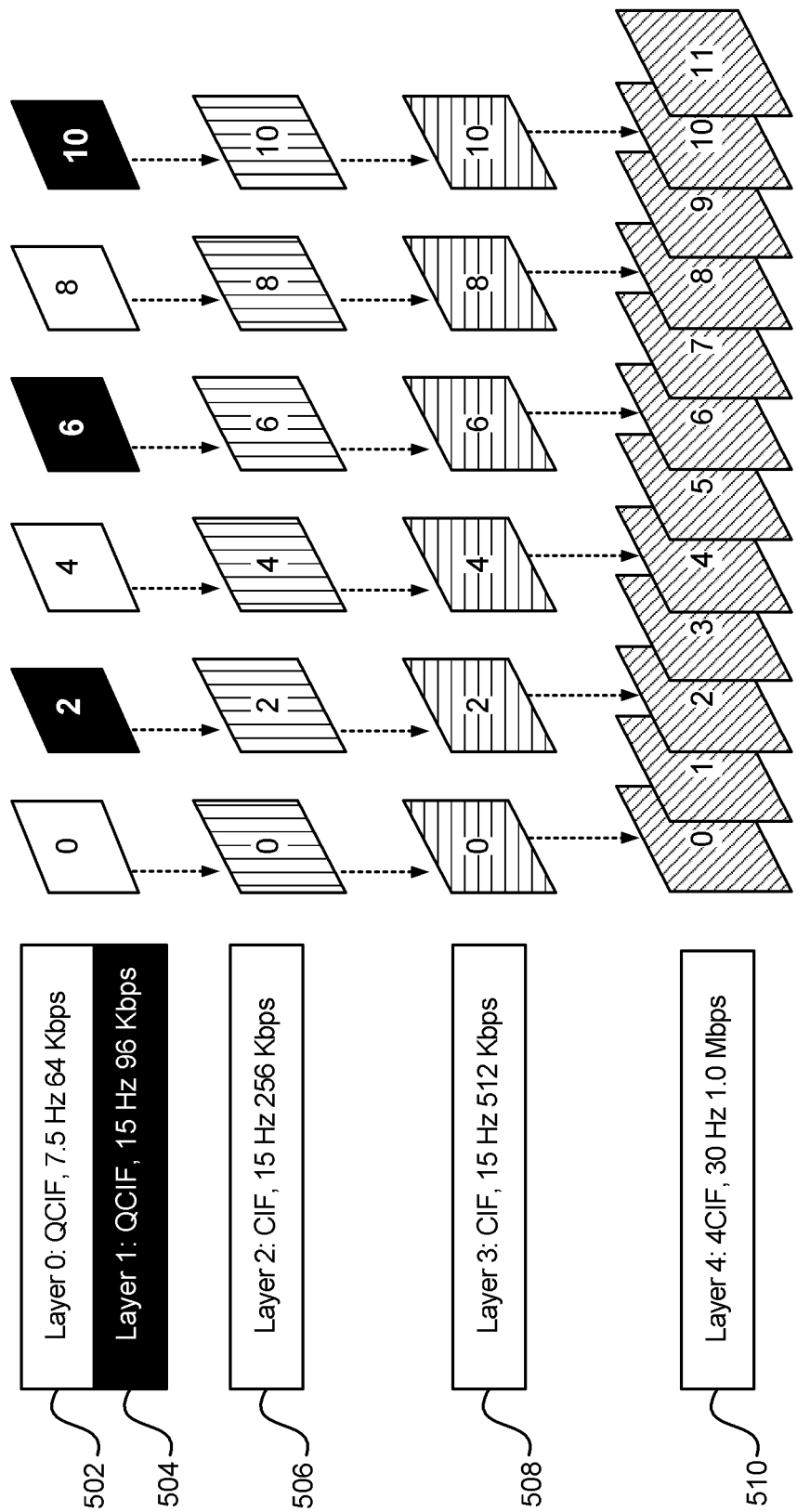
FIG. 5 is a conceptual diagram illustrating an example structure of an SVC bitstream.

FIG. 5 is a conceptual diagram showing an example scalable video coded bitstream. In the example SVC coding structure shown in FIG. 5, the pictures with the lowest spatial and quality layer (pictures in layer 502 and layer 504, which provide QCIF resolution) are compatible with H.264/AVC. Among them, those pictures of the lowest temporal level form the temporal base layer 502, as shown in FIG. 5. This temporal base layer (e.g., layer 502) can be enhanced with pictures of higher temporal levels, such as layer 504. In addition to the H.264/AVC compatible layer, several spatial and/or SNR enhancement layers can be added to provide spatial and/or quality scalabilities. For example, an enhancement layer may be a CIF representation having the same resolution as layer 506. In the example shown in FIG. 5, layer 508 is a SNR enhancement layer. As shown in the example, each spatial or SNR enhancement layer itself may be temporally scalable, with the same temporal scalability structure as the H.264/AVC compatible layer. Also, an enhancement layer can enhance both spatial resolution and frame rate. For example, layer 510 provides a 4CIF enhancement layer, which further increases the frame rate from 15 Hz to 30 Hz.

Figure 6:
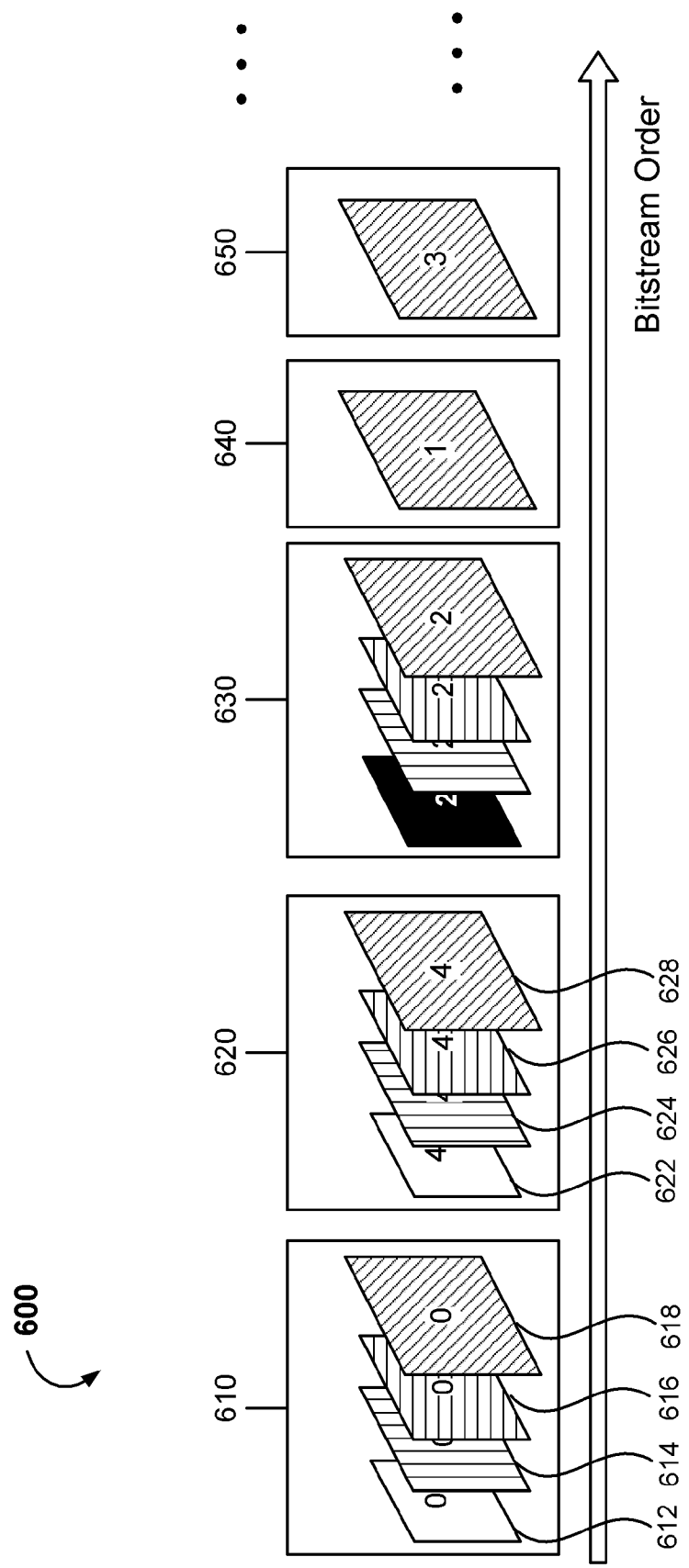
FIG. 6 is a conceptual diagram illustrating access units in an SVC bitstream.

FIG. 6 is a conceptual diagram showing example access units in a scalable video coded bitstream 600. As shown in FIG. 6, in some embodiments, the coded slices in the same time instance are successive in the bitstream order and form one access unit in the context of SVC. Those SVC access units then follow the decoding order, which could be different from the display order. The decoding order may be decided, for example, by the temporal prediction relationship. For example, access unit 610 consisting of all four layers 612, 614, 616, and 618 for frame 0 (e.g., for frame 0 as illustrated in FIG. 5) may be followed by access unit 620 consisting of all four layers 622, 624, 626, and 628 for frame 4 (e.g., for frame 4 in FIG. 5). Access unit 630 for frame 2 may follow out of order, at least from a video playback perspective. However, information from frames 0 and 4 may be used when encoding or decoding frame 2, and therefore frame 4 can be encoded or decoded prior to frame 2. Access units 640 and 650 for the remaining frames between frames 0 and 4 may follow, as shown in FIG. 6.

Some functionalities of SVC may be inherited from H.264/AVC. Compared to previous scalable standards, many aspects of SVC, such as hierarchical temporal scalability, inter-layer prediction, single-loop decoding, and flexible transport interface, may be inherited from H.264/AVC. Each of these aspects of SVC is described in more detail below.

Features of Scalable Video Coding (SVC)

Single-Loop Decoding

In order to achieve a low-complexity decoder, single-loop decoding is used in SVC. With single-loop decoding, each supported layer can be decoded with a single motion compensation loop. To achieve this, the usage of inter-layer intra-prediction is only allowed for enhancement layer macroblocks for which the co-located reference layer signal is intra-coded. It is further required that all layers that are used to inter-layer predict higher layers are coded using constrained intra-prediction (CIP) (e.g., intra-coded without referring to any samples from neighboring inter-coded MBs).

Inter-Layer Prediction

SVC introduces inter-layer prediction for spatial and SNR scalabilities based on texture, residue and motion. Spatial scalability in SVC can be generalized to any resolution ratio between two layers. SNR scalability can be realized by Coarse Granularity Scalability (CGS) or Medium Granularity Scalability (MGS). In SVC, two spatial or CGS layers belong to different dependency layers (indicated by dependency_id in NAL unit header), while two MGS layers can be in the same dependency layer. One dependency layer includes quality layers with quality_id from 0 to higher values, corresponding to quality enhancement layers. In SVC, inter-layer prediction methods are utilized to reduce inter-layer redundancy, as discussed below.

Inter-Layer Intra Prediction

The coding mode using inter-layer intra prediction is called "IntraBL" mode in SVC. To enable single-loop decoding, only the macroblocks (MBs) that have co-located MBs in the base layer coded as constrained intra modes, can use inter-layer intra prediction mode. A constrained intra mode MB is intra-coded without referring to any samples from neighboring inter-coded MBs.

Inter-Layer Residual Prediction

If an MB is indicated (or coded) to use residual prediction, the co-located MB in the base layer for inter-layer prediction must be an inter MB and its residue may be upsampled according to the spatial resolution ratio. The residue difference between the enhancement layer and that of the base layer is coded. That is, the reconstruction of the current frame $\hat{I}_e$ of the enhancement layer equals the sum of de-quantized coefficients $r_e$ of the enhancement layer, the temporal prediction $P_e$ from the enhancement layer, and the quantization normalized residual coefficients $r_b$ of the base layer.

$$\hat{I}_e = r_e + P_e + r_b \quad (1)$$

Inter-Layer Motion Prediction:

The co-located base layer motion vectors may be scaled to generate predictors for the motion vectors of MB or MB partition in the enhancement layer. In addition, there is one MB type named base mode, which sends one flag for each MB. If this flag is true and the corresponding base layer MB is not intra, then motion vectors, partitioning modes and reference indices are all derived from the base layer.

Intra Prediction in HEVC

For intra prediction, previously decoded boundary samples from adjacent prediction units (PU) are used to predict the value of a current video unit. For example, in HEVC, 35 intra prediction modes are available, which are illustrated in FIG. 7A as intra prediction modes 750. Directional prediction with 33 different directional orientations is defined for PU sizes (e.g., square) from 4×4 up to 32×32. The possible prediction directions 756 are shown in FIG. 7A. Alternatively, planar prediction 752 (e.g., assuming an amplitude surface with a horizontal and vertical slope derived from the boundaries) and DC prediction 754 (e.g., a flat surface with a value matching the mean value of boundary) can also be used. For chroma, horizontal, vertical, planar, and DC prediction modes can be explicitly signaled, or the chroma prediction mode can be indicated to be the same as the luma prediction mode. In one embodiment, to avoid redundant signaling, when one of the first four choices is indicated and is the same as the luma prediction mode, the Intra_Angular "34" mode is applied instead.

In the example shown in FIG. 7B, the current PU 762 is intra-predicted using the directional mode "29" shown in FIG. 7A, whose direction is indicated by arrow 766. In this example, the pixels or samples in the current PU 762 are predicted based on the pixels or samples in the boundary samples 764 in the decoded PUs. The values of the pixels or samples in the PU 762 may be calculated as weighted averages of the one or more pixels or samples in the boundary samples 764. Depending on the angle of the prediction direction, the weight given to each of the one or more pixels or samples used to predict a particular pixel may be varied.

Reference Sample Substitution:

Neighboring reference samples are not available at slice or tile boundaries. In addition, when a loss-resilience feature (e.g., constrained intra prediction (CIP)) is enabled, the neighboring reference samples inside any inter-coded blocks are also considered not available (e.g., to avoid letting potentially-corrupted prior decoded picture data propagate errors into the prediction signal). While only Intra_DC prediction mode is allowed for such cases in H.264/MPEG-4 AVC, HEVC allows the use of other intra prediction modes after substituting the unavailable reference sample values (e.g., at slice or tile boundaries, or those marked as not available due to being inter-coded) with the neighboring available reference sample values. When all neighboring samples are marked as not available for intra prediction, the value (1<<(BitDepthY−1)) is substituted for the values of such neighboring samples, where BitDepthY is the bit depth of the luma signal.

Generalized Residual Prediction for HEVC SVC and 3DV Extensions

Figure 7C:
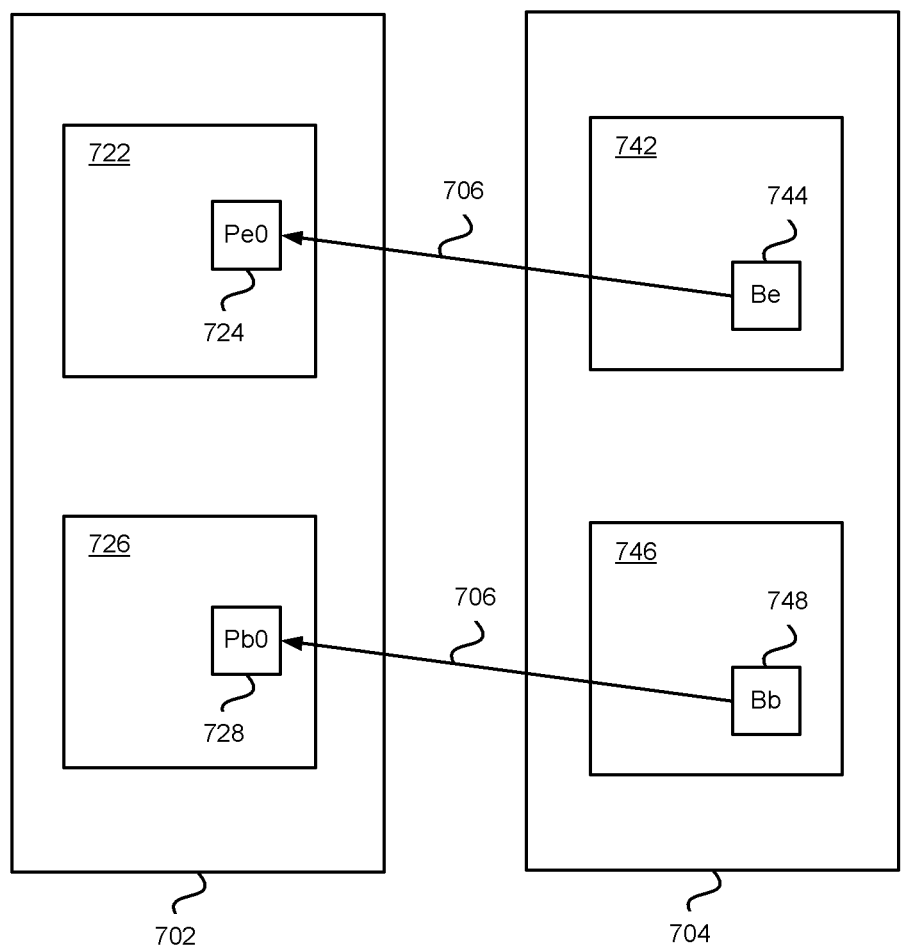
FIG. 7C is a conceptual diagram showing illustrative blocks of video data coded using residual prediction.

FIG. 7C illustrates the use of inter-predicted residues of co-located base layer blocks to predict the residues of an enhancement layer block, according to Generalized Residual Prediction (GRP) mode. As illustrated in FIG. 7C, in GRP mode, inter-predicted residues of co-located base layer blocks may be used to predict those of the current block in an enhancement layer. For example, this method may be applied to inter CUs and skip mode CUs. Residual prediction of this kind may be used for scalable video coding and 3D video coding. The framework of this method is shown in FIG. 7C where the case of uni-prediction is illustrated.

In FIG. 7C, block 744 ($B_e$) and block 748 ($B_b$) denote the current block in the enhancement layer picture 742 and its co-located base layer block in the base layer picture 746, respectively. Block 724 ($P_{e0}$) denotes the temporal prediction for the block 744 ($B_e$) obtained by using motion vector 706. Similarly, block 728 ($P_{b0}$) represents the temporal prediction for block 748 ($B_b$) obtained by using the same motion vector 706 in the up-sampled (e.g., if necessary) base layer reference picture 726. The inter-predicted residue of the base layer block $R_{b0}$ may be obtained by, for example, calculating the difference between blocks 748 and 728, as shown in Equation (2) below:

$$R_{b0} = (B_b - P_{b0}) \quad (2)$$

Considering the temporal prediction 724 ($P_{e0}$) for block 744 ($B_e$), the final uni-prediction P for block 744 ($B_e$) may be obtained as follows:

$$P = P_{e0} + w \cdot (B_b - P_{b0}) \quad (3)$$

where w is a weighting factor, which may, for example, take the values 0, 0.5, or 1.

In some cases (e.g., for P frames), the following variant of Equation (3) is sometimes more efficient:

$$P = B_b + w \cdot (P_{e0} - P_{b0}) \quad (4)$$

where w may equal 0.5, for example. Therefore, in one embodiment, the four weighting modes listed above, e.g., w being 0, 0.5, or 1 in Equation (3) and w being 0.5 in Equation (4) may be used for GRP mode.

In some embodiments, the weighting factor w is signaled at the CU level as a weighting index. The weighting index 0, 1, 2, and 3 (or in different orders) may be used to indicate the weighting modes with w=0, 0.5, and 1 in Equation (3) and w=0.5 in Equation (4), respectively. A truncated unary code in regular CABAC mode is used for the signaling. In some embodiments, the weighting factor w may be a value other than those listed above. The weighting factor w may be chosen, e.g., to minimize computational complexity or improve coding efficiency, for either Equation (3) or Equation (4).

Single MC Interpolation GRP

When motion vector 706 of FIG. 7C points to a sub-pixel position, interpolation filtering can be applied to both the enhancement layer picture and the base layer picture during motion compensation (MC) to obtain the residual ($P_{e0} - w \cdot P_{b0}$) shown below, which can significantly increase coding complexity. To reduce computational complexity and memory bandwidth requirement of GRP mode, single MC interpolation may be performed. For example, equation (3) may be re-written as equation (5), as follows:

$$P = (P_{e0} - w \cdot P_{b0}) + w \cdot B_b \quad (5)$$

Because $P_{e0}$ and $P_{b0}$ share the same motion, MC interpolation can be applied directly to the difference signal between the enhancement layer and base layer pictures ($P_{e0} - w \cdot P_{b0}$) to avoid performing the same MC interpolation process twice. Consequently, since the number of MC interpolation process performed is reduced from two to one, both computational complexity and memory access is reduced. This difference signal ($P_{e0} - w \cdot P_{b0}$) can be generated either at the whole picture level or block-by-block on the fly.

Combined Up-Sampling and MC Interpolation for GRP

In one embodiment, Methods which combine an up-sampling and MC interpolation process for $P_{b0}$ can reduce memory bandwidth requirements and computational complexity.

In another embodiment, the up-sampling operation may also be implemented in the methods described below. For example, if up(•) and int(•) represent the operation of up-sampling and MC interpolation, respectively, Equation (3) can be rewritten as:

$$P = \text{int}(\text{Ref}_{e0}) + w \cdot (\text{up}(\text{Rec}_b) - \text{int}(\text{up}(\text{Ref}_{b0}))) \quad (6)$$

where $\text{Ref}_{e0}$ and $\text{Ref}_{b0}$ denote the reference enhancement block and reference base layer block at integer positions, $\text{Rec}_b$ represents the reconstructed co-located base layer block. In Equation (6), $\text{int}(\text{Ref}_{e0})$, $\text{up}(\text{Rec}_b)$, and $\text{int}(\text{up}(\text{Ref}_{b0}))$ correspond to $P_{e0}$, $B_b$, and $P_{b0}$ in Equation (3), respectively. In some embodiments, an 8-tap up-sampling filter and an 8-tap interpolation filter are used for up(•) and int(•), respectively. Considering the border padding typically used for up-sampling and interpolation, the memory access needed to determine the term int(up($Ref_{b0}$)) in Equation (6) can be quite high, since, in those embodiments, two 8-tap filters are cascaded.

To reduce memory access, the two cascaded 8-tap filters int(up(•)) with one single 8-tap filter iup(•) may be used. For base layer reference block $Ref_{b0}$, enhancement layer motion vector $MV_{eo}$ (e.g., motion vector 706 of FIG. 7C) is scaled to a target accuracy based on the resolution ratio between the enhancement and base layers. Then, int(up(•)) is applied based on scaled $MV_{eo}$. In the cases of 2× and 1.5× scalability, iup( ) with ⅛ pixel accuracy and 1/6 pixel accuracy for luma component is often required. In addition, in some embodiments, a 16-phase combined up-sampling and MC interpolation filter may be implemented.

Generalized Residual Prediction for Intra Blocks

GRP can also be applied to intra blocks. In such a case, $P_{e0}$ and $P_{b0}$ in the equations discussed above would indicate the intra prediction of the current block in the enhancement layer picture and upsampled base layer picture, respectively, where the directions of the two intra predictions $P_{e0}$ and $P_{b0}$ are the same.

Alternatively, intra prediction may be performed in the difference domain first, and base layer pixels may be added back later. For example, the differential picture ($w_e \cdot I_e - w_b \cdot I_b$) between the reconstructed enhancement layer picture $I_e$ and the base layer picture $I_b$ may be calculated first, and then the intra prediction may be directly applied to the differential picture. Note that the case of $w_e = 1$ corresponds to Equation (5) while $w_e = w_b$ corresponds to Equation (4).

Constrained Generalized Residual Prediction

When GRP is applied to an inter block, three reference blocks ($P_e$, $P_b$, and $B_b$) can be accessed to form the prediction of each direction (e.g., depending on whether the block is uni-predicted or bi-predicted). This increases the bandwidth of memory access, which can decrease performance and/or increase computing cost for GRP mode. Therefore, to reduce the bandwidth of memory access during motion compensation of GRP coded blocks, several constraints may be applied to such blocks.

When a fixed tap filter is used, the border padding size is determined by the length of the filter. For example, for an 8-tap up-sampling filter, the padding size may be 7 pixels in each direction. Thus, when a 32×32 block is up-sampled by such a filter, the padded block would be 39×39 which increases the memory access by about 50% (39*39 divided by 32*32). On the other hand, when a 4×4 block is up-sampled by the same filter, the padded block would be 11×11, which is more than a sevenfold increase in memory access (11*11 divided by 4*4). Thus, in certain situations, it may be advantageous to restrict GRP for blocks smaller than a certain threshold.

In one embodiment, GRP mode is disabled (e.g., not used at all) or partially disabled (e.g., restricted in some way, such as only allowing uni-predicted blocks to be coded in GRP mode) for blocks smaller than a threshold size. The threshold size may be predefined or may be signaled in a bitstream at any level such as sequence level, group of pictures (GOP) level, picture level or slice level. When GRP mode is disabled for a particular set of blocks (e.g., bi-predicted blocks smaller than 8×8), no GRP weighting information needs to be coded for these blocks. For example, when GRP mode is allowed only for uni-directional prediction for blocks smaller than 16×16, the GRP weighting index need not be signaled for a bi-predicted block having a size of 8×8. On the other hand, for an 8×8 uni-predicted block, the GRP weighting index can be signaled. Thus, when GRP mode is at least partially disabled, the entropy encoding of GRP weighting information for these blocks may be accordingly modified to reflect the reduced set of GRP weighting indices. Alternatively or additionally, the GRP weighting information can be signaled for the blocks for which GRP mode is disabled, but the GRP weighting information may indicate that the GRP mode is disabled or may be restricted to one or more values indicating that the GRP mode is disabled.

In some cases, for smaller blocks, different GRP weighting information (e.g., GRP weighting factor) may nevertheless lead to similar distortion despite the increased signaling cost for differentiating the GRP weighting information. Thus, in some embodiments, the number of values that the GRP weighting factors may be chosen from may be reduced for blocks smaller than a threshold size. For example, for blocks bigger than a threshold size (e.g., 32×32 blocks), the weighting factor w may be chosen from values 0, 0.5, and 1, and for blocks smaller than a threshold size (e.g., 8×8 blocks), the weighting factor w may be chosen from values 0 and 1.

In another embodiment, GRP mode is not allowed (e.g., disabled) for bi-directional inter-predicted blocks. In some embodiments, GRP weighting indices may be signaled before the prediction direction. In such embodiments, a non-zero GRP weighting index in a inter block indicates that the block is uni-predicted, and thus the flag denoting whether the block is uni-predicted or bi-predicted need not be coded. In other words, redundancy in inter direction flag can be removed since only uni-directional motion vector from list L0 or uni-directional motion vector from list L1 can be signaled (since a non-zero GRP weighting index would not be signaled for a bi-predicted block). Removing the redundancy in inter direction flag coding requires changes in the flag encoding and parsing process. In some embodiments, if it is desirable to keep the inter direction flag coding unchanged, GRP mode can still be applied, but using only one direction out of possible two directions for bi-predicted blocks. For example, if bi-directional prediction is allowed to be signaled, only either the motion vector from L0 or the motion vector from L1 can be used with GRP mode. The selection of the direction to be used for bi-directional motion vectors can be signaled at least as a high level flag at some header such as picture parameter set (PPS), sequence parameter set (SPS), slice or it can be signaled at a block level, such as largest coding unit (LCU), coding unit (CU), or prediction unit (PU) levels.

Figure 8:
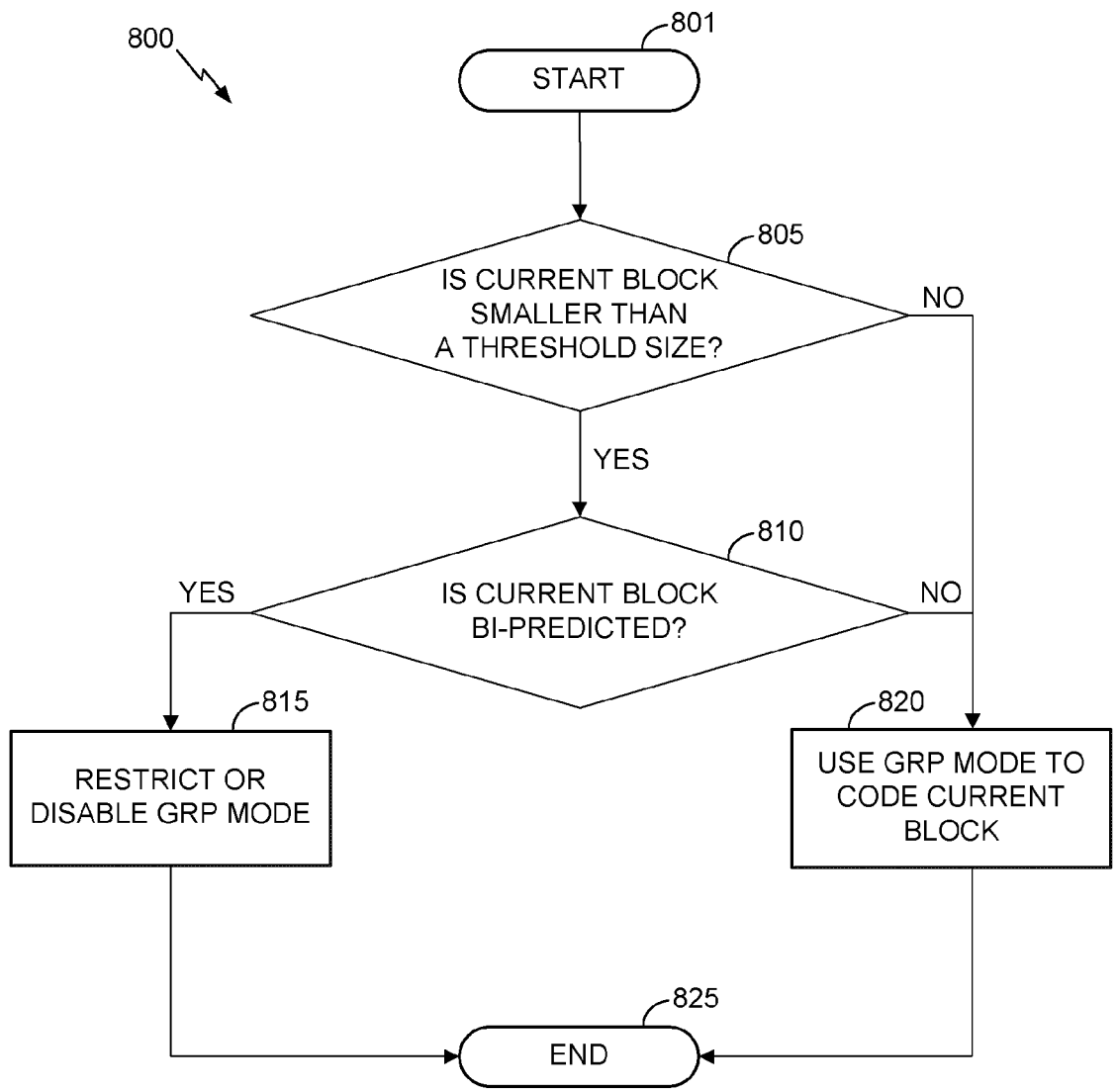
FIG. 8 is a flow chart illustrating a method of coding video information, according to one embodiment of the present disclosure.

FIG. 8 is a flowchart illustrating a method 800 for coding video information, according to an embodiment of the present disclosure. The steps illustrated in FIG. 8 may be performed by an encoder (e.g., the video encoder as shown in FIG. 2), a decoder (e.g., the video decoder as shown in FIG. 3), or any other component. For convenience, the steps are described as performed by a coder, which may be the encoder, the decoder or another component.

The method 800 begins at step 801. In step 805, the coder determines whether the current block is smaller than a threshold size. As discuss above, the threshold size may be predefined or may be signaled in a bitstream at any level. If it is determined that the current block is not smaller than a threshold size, the current block is coded in GRP mode at step 820. Otherwise, the coder further checks whether the current block is bi-predicted (e.g., whether the block has a motion vector in each direction) at step 810. If it is determined that the current block is not bi-predicted, the current block is coded in GRP mode at step 820. If it is determined that the current block is bi-predicted, the block is either coded in restricted GRP mode (e.g., only one of the motion vectors is used for GRP mode), or GRP mode is disabled and the current block is coded without using GRP, for example, by using normal temporal prediction at step 815. The method 800 ends at step 825.

As discussed above, one or more components of video encoder 20 of FIG. 2 or video decoder 30 of FIG. 3 may be used to implement any of the techniques discussed in the present disclosure, such as determining whether the current block is smaller than a threshold size or whether it is bi-predicted or uni-predicted, and coding the current block in GRP mode or in other modes such as temporal prediction.

In another example, if a GRP weighting index is signaled after the inter prediction direction, the GRP weighting index will be signaled only when the prediction direction indicates that the block is uni-predicted. For a bi-predicted block, it can be inferred that the GRP mode is off if bi-directional prediction is signaled (e.g., meaning that the GRP mode is disabled for the bi-predicted block) without signaling of the GRP weighting index. Alternatively, a GRP weighting index can still be signaled for bi-directional motion vectors but it can be equal to zero, indicating that GRP mode is not applied. In yet another embodiment, any GRP weighting index can be signaled for bi-direction but only one direction out of the two possible directions in the bi-directional case can be used, as described above. In such embodiment, whether to use L0 or L1 can be indicated by a flag, as described above.

In another embodiment, GRP may be disabled or partially disabled for uni-predicted blocks. Moreover, the above embodiments may be combined such that GRP mode is disabled or partially disabled for bi-predicted or uni-predicted blocks whose sizes are below a signaled or predefined threshold.

The techniques and restrictions discussed above may also be applied to other interlayer texture prediction methods, such as difference domain prediction methods and combined prediction methods.

Reference Sample Substitution for Intra GRP

In certain situations, when applying intra prediction in the difference domain (e.g., intra GRP), it may be disadvantageous to directly make the reference sample substitution as discussed above in the HEVC standards (e.g., substituting unavailable values with $1<<(BitDepthY-1)$). For example, for 8-bit video coding, where the differential picture is defined as $(I_e-I_b)$, it is not efficient to use $1<<(BitDepthY-1)$, which equals 128, to make the reference sample substitution, since for intra GRP, the pixel value of the residual should normally be zero.

Therefore, to improve coding performance, for intra GRP or difference domain intra prediction, reference sample substitutions are instead made based on the bit depth of the enhancement layer and the manner in which the differential picture is generated. In one embodiment, if the bit depth of the enhancement layer is BD, the value used for reference sample substitution is:

$$(w_e-w_b)\cdot 2^{BD-1} \quad (7)$$

In such embodiment, for 8-bit video coding, the value used for reference sample substitution in difference domain intra prediction equals 0 when $w_e=w_b=1$, and 64 when $w_e=1$ and $w_b=0.5$.

In another embodiment, the reference sample substitution is determined as:

$$(w_e-w_b)\cdot 2^{BD-1}+C \quad (8)$$

where C is a constant, such as, for example, a predefined constant, etc. In such embodiment, for 8-bit video coding, the value used for reference sample substitution in difference domain intra prediction equals 0 when $w_e=w_b=1$ and C=0. In another example, the value equals 64 when $w_e=1$, $w_b=0.5$, and C=0. In another example, the value equals 128 when $w_e=1$, $w_b=1$, and C=128.

Figure 9:
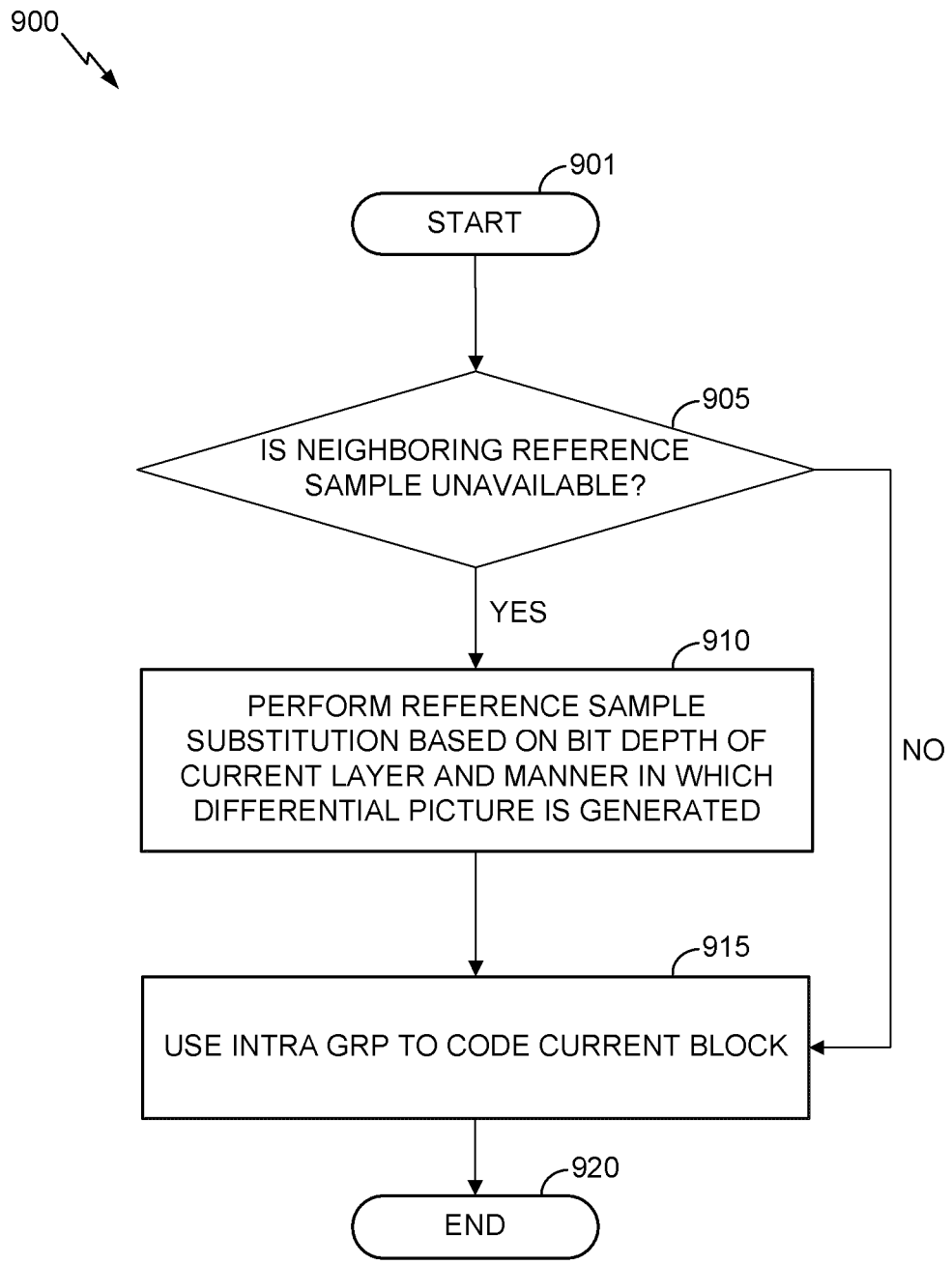
FIG. 9 is a flow chart illustrating a method of coding video information, according to one embodiment of the present disclosure.

FIG. 9 is a flowchart illustrating a method 900 for coding video information, according to an embodiment of the present disclosure. The steps illustrated in FIG. 9 may be performed by an encoder (e.g., the video encoder as shown in FIG. 2), a decoder (e.g., the video decoder as shown in FIG. 3), or any other component. For convenience, method 900 is described as performed by a coder, which may be the encoder, the decoder or another component.

The method 900 begins at block 901. In block 905, the coder determines whether a neighboring reference sample is unavailable (e.g., because the neighboring block is inter-coded or because the current block is at the slice/tile boundary). If it is determined that the neighboring reference sample is not unavailable, the coder proceeds to block 915 and codes the current block using intra GRP. If the coder determines that the neighboring reference sample is unavailable, at block 910, the coder performs reference sample substitution based on bit depth of the current layer and the manner in which differential picture is generated. For example, the coder may use the formulas shown in Equations (7) and (8) to determine the value with which the unavailable reference sample should be replaced. After performing the reference sample substitution, the coder proceeds to block 915 to code the current block using intra GRP at block 915. The method 900 ends at block 920.

As discussed above, one or more components of video encoder 20 of FIG. 2 or video decoder 30 of FIG. 3 may be used to implement any of the techniques discussed in the present disclosure, such as determining whether the neighboring reference sample is unavailable, performing the reference sample substitution based on bit depth and the manner in which differential picture is generated, and/or coding the current block using intra GRP.

Combined Up-Sampling and MC Interpolation for GRP

Embodiments of the methods described below advantageously (1) support more than just 2× and 1.5× scalability; (2) avoid a combined up-sampling and MC interpolation having a 1/16 pixel accuracy for which computational cost in practice is high; and/or (3) avoid using a combined up-sampling and MC interpolation filter that is considerably different from the up-sampling filter used for intraBL mode (which is not preferred in practical implementations). In the discussion below, a combined up-sampling and MC interpolation filter may be referred to as a combined filter.

Enhancement Motion Vector (MV) Scaling

To improve software and hardware compatibility, the enhancement layer MV may be scaled to the accuracy of $2^{-n}$, where n is an integer. The scaling is based on the MV accuracy of the enhancement layer and the resolution ratio between the enhancement layer and base layer.

In one embodiment, the enhancement layer MV is always scaled to 1/16 accuracy. In another embodiment, the accuracy of MV scaling is signaled in a bitstream at a certain level such as sequence parameter set (SPS), picture parameter set (PPS), and slice header.

Phase Quantization of Combined Filter

In general, with a motion vector accuracy of $2^{-n}$, a filter set with $2^n$ phases is used as an interpolation filter. The value n may be pre-defined or signaled in the bitstream. The filter number of an up-sampling filter set and a combined filter is determined based on the quantization accuracy of the fractional phase. The fractional phase of the up-sampling filter may depend on the spatial ratio between two layers. The fractional phase of the combined filter may depend on both the motion vector and the spatial ratio between the two layers.

In one embodiment, the fractional phase of the combined filter and the up-sampling filter is quantized to the same accuracy. The quantization accuracy value may be a pre-defined value, such as 1/8, 1/16, etc. Additionally or alternatively, the phase of both luma and chroma components of the combined filter and up-sampling filter may be quantized with the same accuracy. Additionally or alternatively, the phase number of the combined filter and/or upsampling filter may be signaled in bitstream at a certain level, such as in SPS, PPS, and slice header.

Separable Combined Filter

As mentioned above, a combined filter may be implemented as a combination of an up-sampling filter and an MC interpolation filter. Such design may be preferred at the decoder side. However, separate up-sampling and MC interpolation filters may sometimes be preferred at the encoder side. However, a combined filter may not always be separable. For example, an 8-tap 16-phase filter and an 8-tap 4-phase filter may be combined into an 8-tap 8-phase filter that may yield the same or similar results as the two cascaded filters. In such a case, the combined filter may not be separable.

In one embodiment, a separable combined filter is employed. In such an embodiment, the combined filter can be separated into cascaded up-sampling and MC interpolation filters. For example, an 8-tap combined filter may be separated into two 4-tap filters, where the response of the two cascaded 4-tap filters is the same as that of the combined 8-tap filter. In this manner, an encoder may use two separated filters while a decoder may use the combined filter.

Unification of Combined Filter and Up-Sampling Filter for Inter-Layer Texture Prediction In addition to the combined filter, other up-sampling and interpolation filters may be used in scalable video coding (e.g., SVC, SHVC) such as for inter-layer texture prediction or intraBL mode, and MC interpolation for both base and enhancement layers. In practice, it is advantageous that all these prediction tools share the same filter.

In one embodiment, the combined filter and up-sampling filter for texture prediction (intraBL mode) share the same filter coefficients. Additionally, when the combined filter and the up-sampling filter have the same phase quantization accuracy, as described above, the exact same filter set can be used by both the combined filter and the up-sampling filter. In another embodiment, the combined filter shares the same filter coefficients with the MC interpolation filter. Alternatively, all related coding tools share the same filter coefficients. Moreover, these filter coefficients may be adaptively signaled in a bitstream at a certain level, such as in SPS, PPS, adaptation parameter set (APS), or slice header.

In some embodiments, the same filter may be used for various operations by using only a subset of the phases of the filter. For example, a 16-phase filter may be used for both up-sampling and MC interpolation, where all 16 phases are used for up-sampling, but only 4 phases are used for MC interpolation.

Bilinear Interpolation Filter for Luma and/or Chroma in GRP Mode

To further reduce bandwidth usage, a bi-linear MC interpolation filter may be applied to luma components, chroma components, or both. In one embodiment, a base layer block (luma only, chroma only, or both) is first up-sampled, and then bi-linearly interpolated when the related motion vector points to a sub-pixel position. In one embodiment, the bi-linear interpolation may be performed in one direction (e.g., x-direction) before the other (e.g., y-direction). In another embodiment, the order of performing the interpolation is switched. When bi-linear interpolation is applied to the up-sampled base layer block, bi-linear interpolation may also be applied to the enhancement block (luma only, chroma only, or both). In one embodiment, if both base layer and enhancement layer blocks (luma only, chroma only, or both) are bi-linearly interpolated, single bi-linear interpolation may be directly applied to the difference between the base layer and enhancement layer blocks, instead of performing the interpolation separately on the base layer and enhancement layer blocks.

In another embodiment, up-sampling (e.g., by using a 4-tap filter, a 6-tap filter, an 8-tap filter, etc.), is combined with a bi-linear MC interpolation filter to form a combined up-sampling and MC interpolation filter. This combined filter can be either separable or non-separable, as discussed above.

Simplified Generalized Residual Prediction

As discussed above, in some embodiments, an 8-tap combined up-sampling and MC interpolation filter is used (e.g., instead of two cascaded 8-tap filtering) to reduce memory access requirements and computational complexity. However, in the embodiments that are described below, the bandwidth requirements and signaling cost (which can be especially high when an inferred mode, such as merge, skip, or base mode, is used) for GRP can further be reduced.

Short Combined Up-Sampling and MC Interpolation Filter

As discussed above, generalized residual prediction (GRP) involves up-sampling the base layer reference block (e.g., an 8-tap up-sampling filter used in HEVC) and applying an MC interpolation filter (e.g., an 8-tap MC interpolation filter used in HEVC) on the up-sampled base layer reference block if the enhancement layer motion vector points to a sub-pixel location. However, the amount of border padding required for applying the two cascaded 8-tap filters may result in high memory access requirements for GRP. Thus, in some of the embodiments discussed above, instead of using the two cascaded 8-tap filters, the use of a single combined 8-tap filter for carrying out both the up-sampling and the MC interpolation is proposed.

In another embodiment, a 4-tap up-sampling filter and a bilinear interpolation filter are used for GRP mode. Alternatively, a 5-tap combined up-sampling and MC interpolation filter may be used. The 5-tap combined filter may be separated into cascaded 4-tap up-sampling filter and bilinear interpolation filter. Alternatively, filters no longer than 6-tap may also be used. In another embodiment, a 4-tap combined up-sampling and MC interpolation filter is used for GRP mode. Alternatively, filters no longer than 6-tap may also be used. For example, the type of filters to be used for up-sampling and MC interpolation in GRP mode may be hard-coded into the coder (e.g., encoder or decoder).

Figure 10:
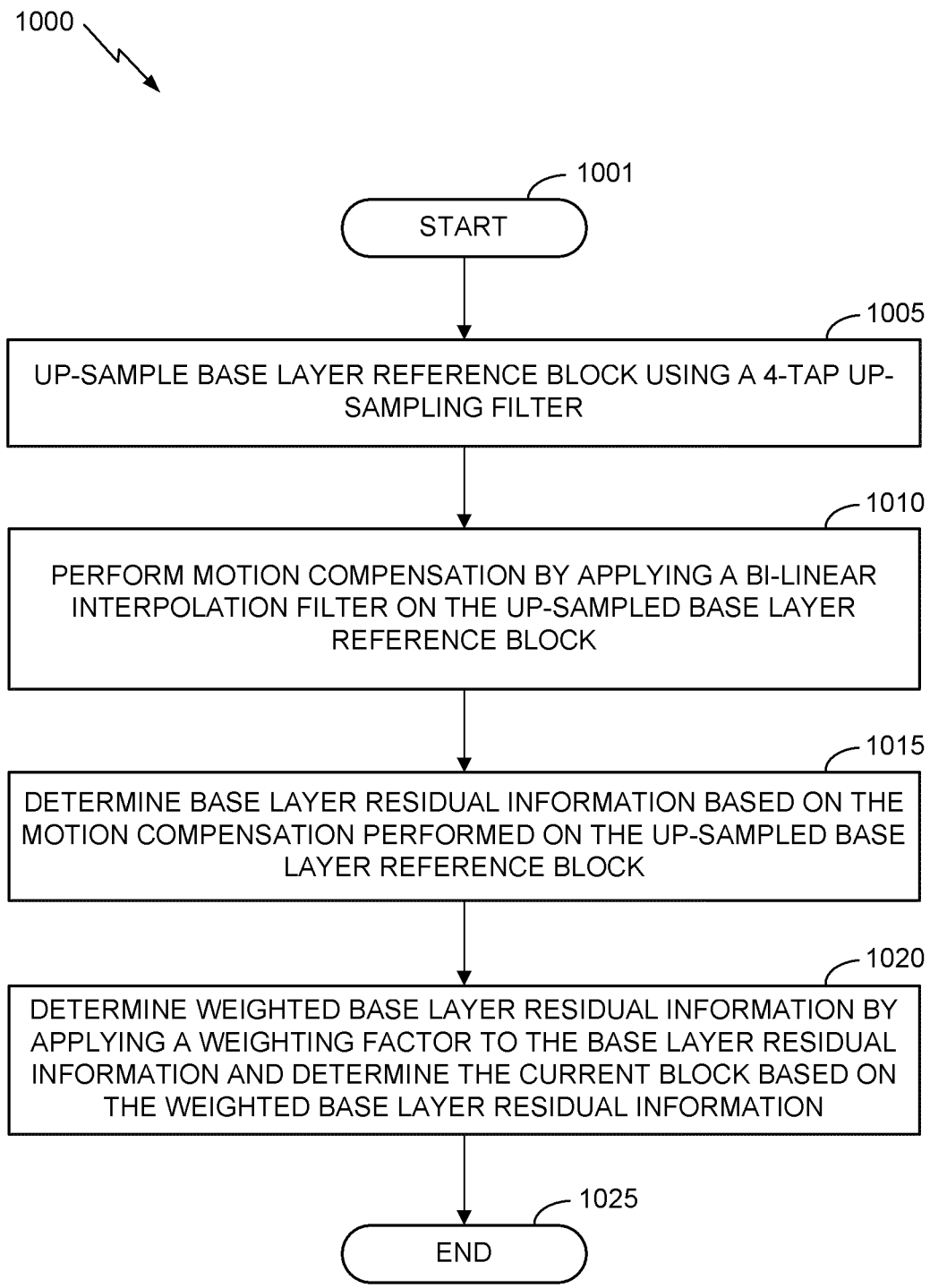
FIG. 10 is a flow chart illustrating a method of coding video information, according to one embodiment of the present disclosure.

FIG. 10 is a flowchart illustrating a method 1000 for coding video information, according to an embodiment of the present disclosure. The steps illustrated in FIG. 10 may be performed by an encoder (e.g., the video encoder as shown in FIG. 2), a decoder (e.g., the video decoder as shown in FIG. 3), or any other component. For convenience, method 1000 is described as performed by a coder, which may be the encoder, the decoder or another component.

The method 1000 begins at block 1001. In block 1005, the coder up-samples the base layer reference block using a 4-tap up-sampling filter. For example, the coder may use the 4-tap 16-phase filter illustrated in Table 1 below. In block 1010, the coder performs motion compensation interpolation by applying a bi-linear interpolation filter on the up-sampled base layer reference block. In block 1015, the coder determines the base layer residual information based on the motion compensation performed in block 1010. In block 1020, the coder determines a weighted base layer residual information by applying a weighting factor w to the base layer residual information, and determines (e.g., predicts or reconstructs) the current block based on the weighted base layer residual information. For example, the current block may be determined according to the formula shown in Equation (6) discussed above. The method 1000 ends at block 1025.

As discussed above, one or more components of video encoder 20 of FIG. 2 or video decoder 30 of FIG. 3 may be used to implement any of the techniques discussed in the present disclosure, such as applying a 4-tap up-sampling filter or a bi-linear interpolation filter, determining the base layer residual information, and determining the current block based on the weighted base layer residual information.

In one embodiment, a 4-tap 16-phase filter provided below in Table 1 may be used. It may be used as an up-sampling filter, an MC interpolation filter, or a combined filter for GRP mode.

TABLE 1

Example of Filter Coefficients for a 4-Tap 16-Phase Filter

| Phase | Filter Coefficients |
|---|---|
| 0 | 9, 46, 9, 0 |
| 1 | 10, 40, 14, 0 |
| 2 | 8, 40, 17, −1 |
| 3 | 6, 40, 19, −1 |
| 4 | 4, 39, 22, −1 |
| 5 | 2, 38, 25, −1 |
| 6 | 2, 36, 27, −1 |
| 7 | 1, 34, 30, −1 |
| 8 | 0, 32, 32, 0 |
| 9 | −1, 30, 34, 1 |
| 10 | −1, 27, 36, 2 |
| 11 | −1, 25, 38, 2 |
| 12 | −1, 22, 39, 4 |
| 13 | −1, 19, 40, 6 |
| 14 | −1, 17, 40, 8 |
| 15 | 0, 14, 40, 10 |

3-Tap Up-Sampling/Smoothing Filter

In one embodiment, a 3-tap smoothing filter (which may also be considered a 1:1 up-sampling filter) is applied to GRP mode in the SNR case. For example, in one embodiment, the filter coefficients are (9, 46, 9). In another embodiment, a 3-tap up-sampling/inter-layer filter is used for GRP mode in both spatial and SNR cases. Two example sets of coefficients for such 3-tap up-sampling/inter-layer filter are shown below in Tables 2 and 3.

TABLE 2

Example of a 3-Tap Up-Sampling/Inter-Layer Filter

| Phase | Filter Coefficients |
|---|---|
| 0 | 9, 46, 9 |
| 1 | 7, 45, 12 |
| 2 | 5, 45, 14 |
| 3 | 3, 44, 17 |
| 4 | 2, 42, 20 |
| 5 | 1, 40, 23 |
| 6 | 0, 38, 26 |
| 7 | 0, 35, 29 |
| 8 | 0, 32, 32 |
| 9 | 0, 29, 35 |
| 10 | 1, 26, 37 |
| 11 | 1, 23, 40 |
| 12 | 2, 20, 42 |

TABLE 2-continued

Example of a 3-Tap Up-Sampling/Inter-Layer Filter

| Phase | Filter Coefficients |
|---|---|
| 13 | 3, 17, 44 |
| 14 | 3, 15, 46 |
| 15 | 4, 12, 48 |

TABLE 3

Example of a 3-Tap Up-Sampling/Inter-Layer Filter

| Phase | Filter Coefficients |
|---|---|
| 0 | 8, 48, 8 |
| 1 | 6, 47, 11 |
| 2 | 4, 47, 13 |
| 3 | 2, 46, 16 |
| 4 | 1, 44, 19 |
| 5 | 0, 41, 23 |
| 6 | 0, 38, 26 |
| 7 | 0, 35, 29 |
| 8 | 0, 32, 32 |
| 9 | 0, 29, 35 |
| 10 | 1, 25, 38 |
| 11 | 2, 22, 40 |
| 12 | 2, 19, 43 |
| 13 | 3, 16, 45 |
| 14 | 4, 13, 47 |
| 15 | 5, 11, 48 |

Figure 11:
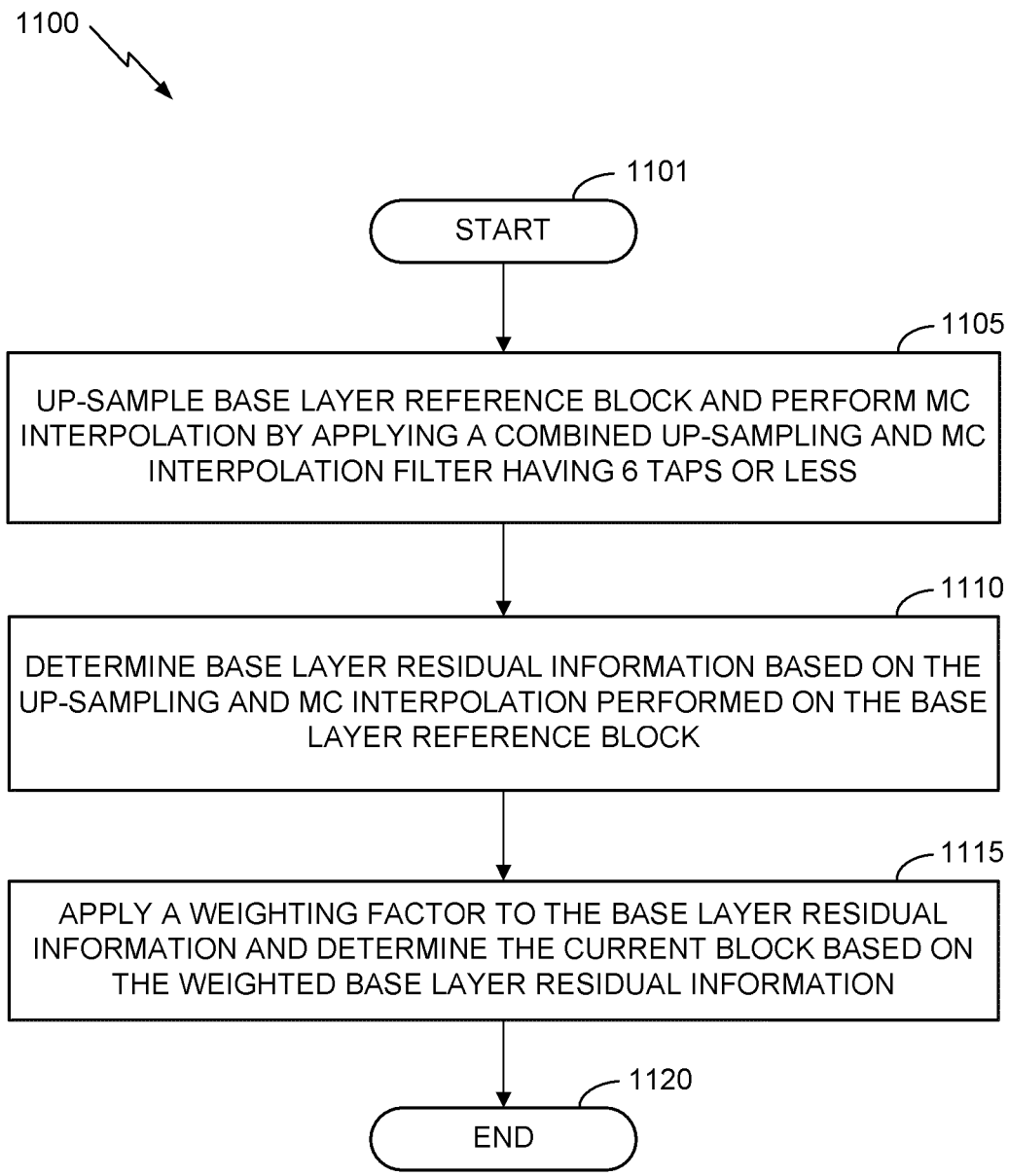
FIG. 11 is a flow chart illustrating a method of coding video information, according to one embodiment of the present disclosure.

FIG. 11 is a flowchart illustrating a method 1100 for coding video information, according to an embodiment of the present disclosure. The steps illustrated in FIG. 11 may be performed by an encoder (e.g., the video encoder as shown in FIG. 2), a decoder (e.g., the video decoder as shown in FIG. 3), or any other component. For convenience, method 1100 is described as performed by a coder, which may be the encoder, the decoder or another component.

The method 1100 begins at block 1101. In block 1105, the coder up-samples the base layer reference block and performs MC interpolation by applying a combined up-sampling and MC interpolation filter having 6 taps or less. In one embodiment, a 5-tap combined up-sampling and MC interpolation filter is used. In another embodiment, a 4-tap combined up-sampling and MC interpolation filter such as shown in Table 1 is used. In yet another embodiment, a 3-tap combined up-sampling and MC interpolation filter such as shown in Tables 2 and 3 is used. In block 1110, the coder determines the base layer residual information based on the up-sampling and MC interpolation performed on the base layer reference block. In block 1115, a weighting factor w is applied to the base layer residual information and the current block is determined (e.g., predicted or reconstructed) based on the weighted base layer residual information. For example, the current block may be determined according to the formula shown in Equation (6) discussed above. The method 1100 ends at block 1120.

As discussed above, one or more components of video encoder 20 of FIG. 2 or video decoder 30 of FIG. 3 may be used to implement any of the techniques discussed in the present disclosure, such as applying a combined up-sampling and MC interpolation filter.

Disabling GRP for Particular Video Signal Components

In one embodiment, GRP is only applied to the luma components. In such embodiment, GRP is disabled for the chroma components, and normal temporal prediction is used for the chroma components. In other embodiments, GRP may be applied to any combination of video signal components, such as luma only or chroma only. For example, in some embodiments, GRP is only applied to the chroma components. In such embodiments, GRP is disabled for the luma components, and normal temporal prediction is used for the luma components.

In another embodiment, GRP is applied normally for blocks in a specified size range, and for blocks outside the specified range, GRP is applied to only a subset of the video signal components, such as luma only or chroma only. In another embodiment, GRP is applied normally for blocks bigger than a threshold size, and for blocks smaller than or equal to the threshold size, GRP is applied to only a subset of the video signal components, such as luma only or chroma only. The size range or the threshold size may be predefined or may be signaled in a bitstream at any level such as sequence level, group of pictures (GOP) level, picture level or slice level.

Figure 12:
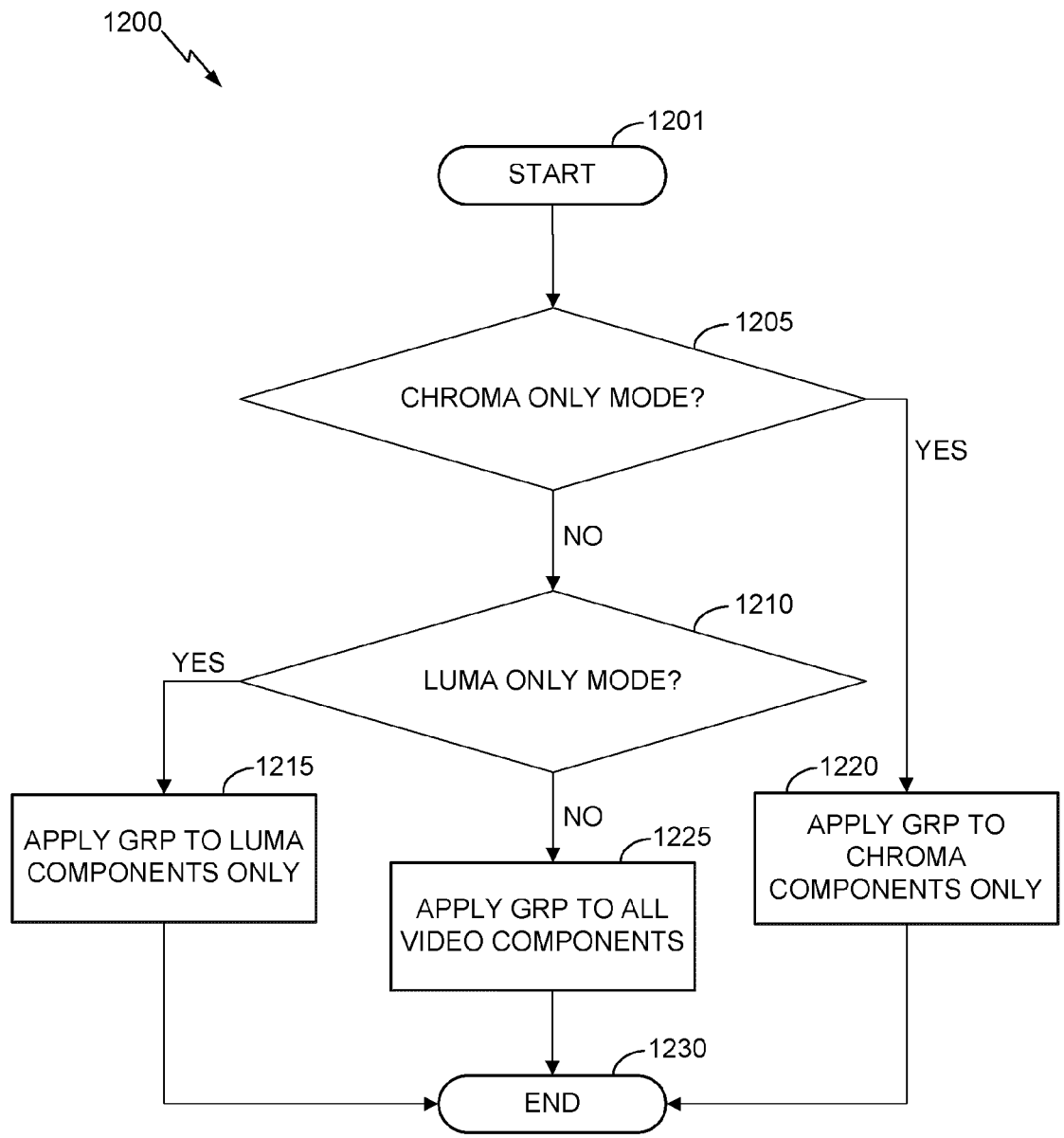
FIG. 12 is a flow chart illustrating a method of coding video information, according to one embodiment of the present disclosure.

FIG. 12 is a flowchart illustrating a method 1200 for coding video information, according to an embodiment of the present disclosure. The steps illustrated in FIG. 12 may be performed by an encoder (e.g., the video encoder as shown in FIG. 2), a decoder (e.g., the video decoder as shown in FIG. 3), or any other component. For convenience, method 1200 is described as performed by a coder, which may be the encoder, the decoder or another component.

The method 1200 begins at block 1201. In block 1205, the coder determines whether a chroma only mode is enabled. If it is determined that the chroma only mode is enabled, the coder proceeds to block 1220 and applies GRP only to the chroma components and applies normal temporal prediction to the luma components. If it is determined that the chroma only mode is not enabled, the coder proceeds to block 1210 and determines whether a luma only mode is enabled. If it is determined that the luma only mode is enabled, the coder proceeds to block 1215 and applies GRP only to the luma components and applies normal temporal prediction to the chroma components. If it is determined that the luma only mode is not enabled, the coder proceeds to block 1225 and applies GRP to all video components (e.g., to both luma and chroma components). The method 1200 ends at block 1230.

In another embodiment, one or more steps illustrated in FIG. 12 may be omitted or switched. For example, it may be determined whether the luma only mode is enabled before it is determined whether the chroma only mode is enabled. Further, the coder may automatically assume that if luma only mode is enabled, the chroma only mode is not enabled, and vice versa. Also, the coder may only check whether the luma only (or chroma only) mode is enabled without checking whether the other mode is enabled.

As discussed above, one or more components of video encoder 20 of FIG. 2 or video decoder 30 of FIG. 3 may be used to implement any of the techniques discussed in the present disclosure, such as applying GRP only to the luma components or only to the chroma components.

Inferred GRP Weighting in Skip/Merge or Base Mode

When GRP is applied, weighting information is signaled at a certain level such as at a CU level or PU level. In one embodiment, for inferred mode (e.g., skip/merge CU/PU), the GRP weighting information of the current CU/PU is copied (e.g., inferred) from a spatially and/or temporally neighboring CU/PU in the same way that motion information is derived. For example, the GRP weighting information for the current PU may be derived from a PU that is neighboring or adjacent to the current PU. In another example, the GRP weighting information for the current PU may be derived from a PU in a picture that is temporally adjacent to the current picture in which the current PU is located. Consequently, in such embodiment, the GRP weighting information is not explicitly coded for the CU/PU, resulting in signaling cost savings.

In another embodiment, for inferred mode, the GRP weighting information is set to a default value and no GRP weighting information is explicitly signaled for the CU/PU. The default value may be predefined, or signaled in the bitstream at any level, such as in a sequence parameter set (SPS), picture parameter set (PPS), adaptation parameter set (APS), slice header, etc.

In another embodiment, for inferred mode, where motion information and/or partition information is derived from the base layer, the GRP weighting information of the CU/PU is also derived from the base layer. When the base layer is the first layer in the bitstream (e.g., an HEVC compatible layer), the GRP weighting information may be set to a default value, which may be pre-defined or signaled in the bitstream. When the base layer is the enhancement layer of another layer, the GRP weighting information may be directly derived from its base layer, for example, by copying it from the co-located base layer block, or from the base layer center block, or from the base layer bottom right block, or in the same way that the motion information is derived. When the related (e.g., co-located) base layer block is intra-coded, a default GRP weighting value may be used. This default value may be predefined or explicitly signaled in the bitstream.

In another embodiment, when an up-sampled (including 1:1 up-sampling) base layer picture is put into a reference picture list of an enhancement layer, the GRP weighting information may also be included in the new reference picture. The mapping process may be the same as the mapping of motion information. For example, a new reference picture including the GRP weighting information as well as the up-sampled base layer picture may be added to the reference picture list of the enhancement layer. In one embodiment, a field of GRP weighting information may be associated with the respective portions of the up-sampled base layer picture. Consequently, the GRP weighting information may be derived in the same way as a temporal motion vector predictor (TMVP).

Figure 13:
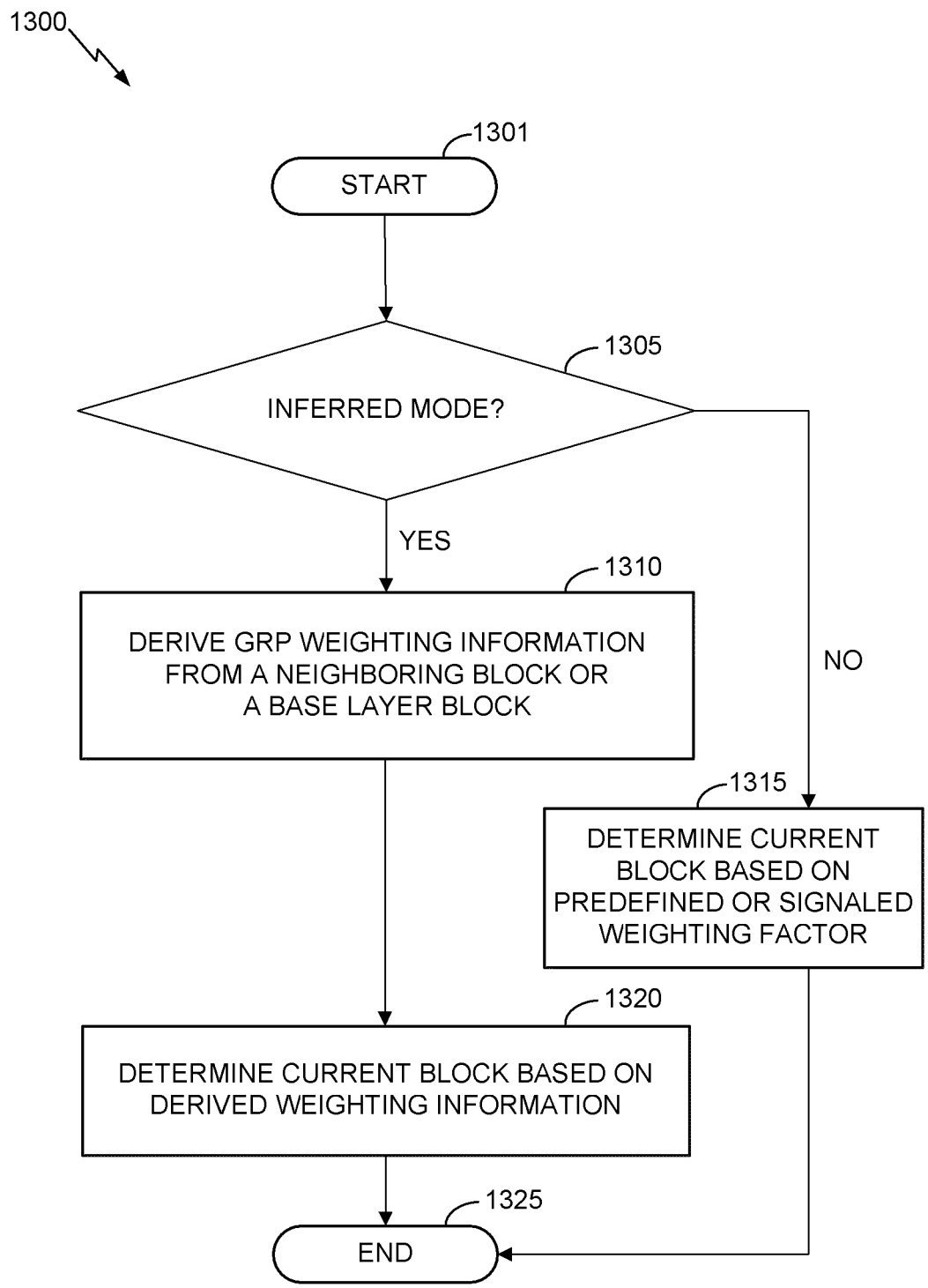
FIG. 13 is a flow chart illustrating a method of coding video information, according to one embodiment of the present disclosure.

FIG. 13 is a flowchart illustrating a method 1300 for coding video information, according to an embodiment of the present disclosure. The steps illustrated in FIG. 13 may be performed by an encoder (e.g., the video encoder as shown in FIG. 2), a decoder (e.g., the video decoder as shown in FIG. 3), or any other component. For convenience, method 1300 is described as performed by a coder, which may be the encoder, the decoder or another component.

The method 1300 begins at block 1301. In block 1305, the coder determines whether the current block is coded in inferred mode (e.g., skip CU/PU or merge CU/PU). If it is determined that the current block is not coded in inferred mode, the coder proceeds to block 1315 and determines the current block based on a pre-defined or signaled weighting factor. If it is determined that the current block is coded in inferred mode, the coder proceeds to block 1310 and derives the GRP weighting information from a neighboring block or a base layer block. In block 1320, the coder determines the current block based on the derived weighting information. The method 1300 ends at block 1325.

As discussed above, one or more components of video encoder 20 of FIG. 2 or video decoder 30 of FIG. 3 may be used to implement any of the techniques discussed in the present disclosure, such as deriving GRP weighting information from a temporally or spatially neighboring block.

Avoid Accessing Base Layer References

In GRP, base layer references are accessed (and are up-sampled in the spatial case). However, there may be situations where accessing such base layer references would be undesirable. In one embodiment, to avoid accessing base layer references, base layer references are mimicked by filtering related (e.g., co-located) enhancement layer references with a low pass filter. For example, instead of accessing a base layer reference, an enhancement layer reference that is co-located with the base layer reference may be filtered with a low pass filter and accessed in the course of performing the GRP. Thus, the filtered enhancement layer reference can "mimic" the co-located base layer reference, and accessing of the base layer reference can be avoided.

In one embodiment, a fixed low-pass filter is applied to enhancement layer references to mimic any related (e.g., co-located, neighboring, or any other) up-sampled base layer references that need to be accessed for GRP. The mimicked references can be used instead of the up-sampled base layer references in GRP. For example, the fixed 4-tap or 3-tap filters mentioned above may be used to filter enhancement layer references to derive the mimicked references. In another embodiment, an adaptive filter is used to generate mimicked up-sampled base layer references. The filter coefficients may be signaled in a bitstream of the enhancement layer, such as in a PPS, APS, or slice header, etc.

Figure 14:
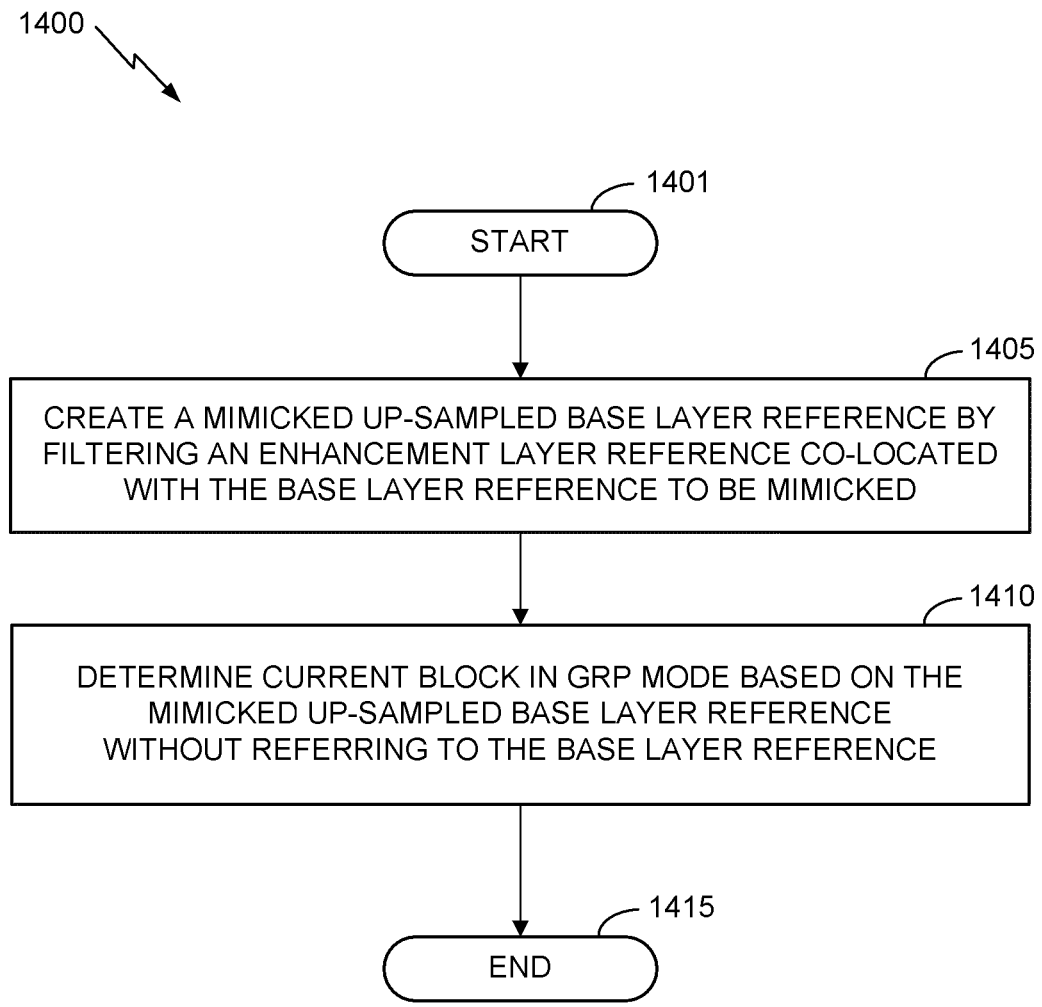
FIG. 14 is a flow chart illustrating a method of coding video information, according to one embodiment of the present disclosure.

FIG. 14 is a flowchart illustrating a method 1400 for coding video information, according to an embodiment of the present disclosure. The steps illustrated in FIG. 14 may be performed by an encoder (e.g., the video encoder as shown in FIG. 2), a decoder (e.g., the video decoder as shown in FIG. 3), or any other component. For convenience, method 1400 is described as performed by a coder, which may be the encoder, the decoder or another component.

The method 1400 begins at block 1401. In block 1405, the coder creates a mimicked up-sampled base layer reference by filtering the co-located enhancement layer reference. For example, the coder can use any of the filters discussed above, such as the fixed low-pass filter or the adaptive filter, to create the mimicked up-sampled base layer reference. In block 1410, the coder determines the current block in GRP mode based on the mimicked up-sampled base layer reference without referring to the base layer reference. For example, the mimicked reference can be used instead of the up-sampled base layer reference (e.g., shown in Equation (6)) to predict or reconstruct the current block in GRP mode. The method 1400 ends at block 1415.

As discussed above, one or more components of video encoder 20 of FIG. 2 or video decoder 30 of FIG. 3 may be used to implement any of the techniques discussed in the present disclosure, such as creating or deriving a mimicked up-sampled base layer reference by filtering the co-located or other related enhancement layer reference, and determining the current block based on the mimicked reference.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video information, the apparatus comprising:
a memory configured to store video information associated with a base layer and an enhancement layer; and
a processor in communication with the memory, the processor configured to:
determine a base layer reference block using an enhancement layer motion vector;
up-sample the base layer reference block by using an up-sampling filter when the base and enhancement layers have different resolutions;
perform motion compensation interpolation by filtering the up-sampled base layer reference block;
determine base layer residual information based on the filtered up-sampled base layer reference block;
determine weighted base layer residual information by applying a weighting factor to the base layer residual information; and
perform one of: (i) in response to determining that a luma-only mode is enabled, determine only a luma component of an enhancement layer block based on the weighted base layer residual information and determine chroma components of the enhancement layer block by using intra-layer temporal prediction, or (ii) in response to determining that a chroma-only mode is enabled, determine only the chroma components of the enhancement layer block based on the weighted base layer residual information and determine the luma component of the enhancement layer block by using intra-layer temporal prediction,
wherein the up-sampling filter has 6 or fewer taps.

2. The apparatus of claim 1, wherein the processor is configured to up-sample the base layer reference block using a 4-tap up-sampling filter, and perform the motion compensation interpolation using a bilinear interpolation filter.

3. The apparatus of claim 1, wherein the processor is configured to up-sample the base layer reference block and perform the motion compensation interpolation by applying a single 5-tap combined up-sampling and motion compensation interpolation filter.

4. The apparatus of claim 3, wherein the combined up-sampling and motion compensation interpolation filter has 16 phases for both the luma component and the chroma components of the enhancement layer block.

5. The apparatus of claim 4, wherein the enhancement layer motion vector is scaled to the accuracy of $1/16$ of a pixel.

6. The apparatus of claim 1, wherein the processor is further configured to use at least one of a 3-tap smoothing filter, a 3-tap up-sampling filter, or a 3-tap inter-layer filter to perform smoothing, up-sampling, or other inter-layer filtering.

7. A method of coding video information, the method comprising:
storing video information associated with a base layer and an enhancement layer;
determining a base layer reference block using an enhancement layer motion vector;
up-sampling the base layer reference block by using an up-sampling filter having 6 or fewer taps when the base and enhancement layers have different resolutions;
performing motion compensation interpolation by filtering the up-sampled base layer reference block;
determining base layer residual information based on the filtered up-sampled base layer reference block;
determining weighted base layer residual information by applying a weighting factor to the base layer residual information; and
performing one of: (i) in response to determining that a luma-only mode is enabled, determining only a luma component of an enhancement layer block based on the weighted base layer residual information and determining chroma components of the enhancement layer block by using intra-layer temporal prediction, or (ii) in response to determining that a chroma-only mode is enabled, determining only the chroma components of the enhancement layer block based on the weighted base layer residual information and determining the luma component of the enhancement layer block by using intra-layer temporal prediction.

8. The method of claim 7, wherein the up-sampling filter is a 4-tap up-sampling filter, and the motion compensation interpolation is performed by using a bilinear interpolation filter.

9. The method of claim 7, wherein the up-sampling and the motion compensation interpolation are performed together by applying a single 5-tap combined up-sampling and motion compensation interpolation filter.

10. The method of claim 9, wherein the combined up-sampling and motion compensation interpolation filter has 16 phases for both the luma component and the chroma components of the enhancement layer block.

11. The method of claim 10, wherein the enhancement layer motion vector is scaled to the accuracy of $1/16$ of a pixel.

12. The method of claim 7, further comprising using at least one of a 3-tap smoothing filter, a 3-tap up-sampling filter, or a 3-tap inter-layer filter to perform smoothing, up-sampling, or other inter-layer filtering.

13. An apparatus configured to code video information, the apparatus comprising:
a memory configured to store video information associated with a base layer and an enhancement layer; and
a processor in communication with the memory, the processor configured to:
determine whether an enhancement layer block has a size that is greater or equal to a threshold size; and
perform generalized residual prediction (GRP), in response to determining that the enhancement layer block has a size that is greater than or equal to the threshold size, at least by:
up-sampling a base layer reference block by using an up-sampling filter when the base and enhancement layers have different resolutions;
performing motion compensation interpolation by filtering the up-sampled base layer reference block;
determining base layer residual information based on the filtered up-sampled base layer reference block;
determining weighted base layer residual information by applying a weighting factor to the base layer residual information; and
performing one of: (i) in response to determining that a luma-only mode is enabled, determining only a luma component of the enhancement layer block based on the weighted base layer residual information and determining chroma components of the enhancement layer block by using intra-layer temporal prediction, or (ii) in response to determining that a chroma-only mode is enabled, determining only the chroma components of the enhancement layer block based on the weighted base layer residual information and determining the luma component of the enhancement layer block by using intra-layer temporal prediction.

14. The apparatus of claim 13, wherein the processor, in response to determining that the enhancement layer block has a size that is not greater than or equal to the threshold size, performs GRP for the enhancement layer block only if the enhancement layer block is a uni-predicted block.

15. The apparatus of claim 13, wherein the GRP performed by the processor includes intra prediction, and a neighboring reference sample that is adjacent to the enhancement layer block and is unavailable for use in the intra prediction is substituted based on a bit depth of the enhancement layer and whether the intra prediction is performed in a difference domain.

16. The apparatus of claim 13, wherein the weighting factor is derived from a block that is spatially neighboring or adjacent to the enhancement layer block, a block in a picture temporally adjacent to a current picture in which the enhancement layer block is located, or a base layer block that is co-located with the enhancement layer block.

17. The apparatus of claim 13, wherein the weighting factor is set to a default value, and no weighting information is signaled for the enhancement layer block.

18. The apparatus of claim 13, wherein the processor is configured to add an inter-layer reference picture including GRP weighting information and an upsampled texture picture of the base layer to a reference picture list.

19. The apparatus of claim 13, wherein the processor is configured to determine a mimicked base layer reference picture that can be accessed instead of accessing a base layer reference picture, by filtering an enhancement layer reference picture that is co-located with the base layer reference picture, and to determine the enhancement layer block based on the mimicked base layer reference picture.

20. The apparatus of claim 19, wherein the processor is configured to filter the co-located enhancement layer reference picture using at least one of a fixed 4-tap low-pass filter, a fixed 3-tap low-pass filter, or an adaptive filter.

21. A method of coding video information, the apparatus comprising:
    storing video information associated with a base layer and an enhancement layer;
    determining whether an enhancement layer block has a size that is greater than or equal to a threshold size; and
    performing generalized residual prediction (GRP), in response to determining that the enhancement layer block has a size that is greater than or equal to the threshold size, at least by:
        up-sampling a base layer reference block by using an up-sampling filter when the base and enhancement layers have different resolutions;
        performing motion compensation interpolation by filtering the up-sampled base layer reference block;
        determining base layer residual information based on the filtered up-sampled base layer reference block;
        determining weighted base layer residual information by applying a weighting factor to the base layer residual information; and
        performing one of: (i) in response to determining that a luma-only mode is enabled, determining only a luma component of the enhancement layer block based on the weighted base layer residual information and determining chroma components of the enhancement layer block by using intra-layer temporal prediction, or (ii) in response to determining that a chroma-only mode is enabled, determining only the chroma components of the enhancement layer block based on the weighted base layer residual information and determining the luma component of the enhancement layer block by using intra-layer temporal prediction.

22. The method of claim 21, further comprising performing GRP, in response to determining that the enhancement layer block has a size that is not greater than or equal to the threshold size, for the enhancement layer block only if the enhancement layer block is a uni-predicted block.

23. The method of claim 21, wherein the GRP performed includes intra prediction, and a neighboring reference sample that is adjacent to the enhancement layer block and is unavailable for use in the intra prediction is substituted based on a bit depth of the enhancement layer and whether the intra prediction is performed in a different domain.

24. The method of claim 21, wherein the weighting factor is derived from a block that is spatially neighboring or adjacent to the enhancement layer block, a block in a picture that is temporally adjacent to a current picture in which the enhancement layer block is located, or a base layer block that is co-located with the enhancement layer block.

25. The method of claim 21, wherein the weighting factor is set to a default value, and no weighting information is signaled for the enhancement layer block.

26. The method of claim 21, further comprising adding an inter-layer reference picture including GRP weighting information and an upsampled texture picture of the base layer to a reference picture list.

27. The method of claim 21, further comprising:
    determining a mimicked base layer reference picture that can be accessed instead of a base layer reference picture, by filtering a co-located enhancement layer reference picture that is co-located with the base layer reference picture; and
    determining the enhancement layer block based on the mimicked base layer reference picture.

28. The method of claim 27, wherein the co-located enhancement layer reference picture is filtered using at least one of a fixed 4-tap low-pass filter, a fixed 3-tap low-pass filter, or an adaptive filter.

* * * * *